United States Patent
Nakamura et al.

(10) Patent No.: US 8,250,451 B2
(45) Date of Patent: Aug. 21, 2012

(54) IC CARD, INFORMATION PROCESSING DEVICE, COMMUNICATION TYPE IDENTIFICATION METHOD, AND PROGRAM

(75) Inventors: Masaki Nakamura, Kanagawa (JP); Atsuo Yoneda, Kanagawa (JP)

(73) Assignee: FeliCa Networks, Inc., Tokyo (JP)

( * ) Notice: Subject to any disclaimer, the term of this patent is extended or adjusted under 35 U.S.C. 154(b) by 940 days.

(21) Appl. No.: 12/273,971

(22) Filed: Nov. 19, 2008

(65) Prior Publication Data

US 2009/0132898 A1    May 21, 2009

(30) Foreign Application Priority Data

Nov. 19, 2007    (JP) .................................. 2007-299794

(51) Int. Cl.
*G06F 11/00* (2006.01)
(52) U.S. Cl. .................. 714/799; 714/764; 714/774
(58) Field of Classification Search .................. 714/799, 714/764, 774, 798; 235/380, 492
See application file for complete search history.

(56) References Cited

U.S. PATENT DOCUMENTS

| | | | | |
|---|---|---|---|---|
| 4,816,656 | A * | 3/1989 | Nakano et al. ................. | 235/380 |
| 4,885,788 | A * | 12/1989 | Takaragi et al. ................. | 705/67 |
| 5,727,230 | A * | 3/1998 | Fujioka ............................. | 710/5 |
| 6,036,100 | A * | 3/2000 | Asami ............................ | 235/492 |
| 6,578,768 | B1 * | 6/2003 | Binder et al. ................. | 235/492 |
| 7,224,988 | B1 * | 5/2007 | Appelman ................. | 455/456.3 |

FOREIGN PATENT DOCUMENTS

| | | |
|---|---|---|
| JP | 2003-233787 | 8/2003 |
| JP | 2005-094760 | 4/2005 |
| JP | 2006-060363 | 3/2006 |

OTHER PUBLICATIONS

Chinese Office Action dated Jun. 30, 2010 in corresponding Chinese Appilcation No. 200810178120.5 (with English Translation).

* cited by examiner

*Primary Examiner* — Fritz Alphonse
(74) *Attorney, Agent, or Firm* — Oblon, Spivak, McClelland, Maier & Neustadt, L.L.P.

(57) ABSTRACT

An IC card is provided that is capable of identifying a communication type of incoming data received by non-contact communication. The IC card includes: an error detection portion that, for each of a plurality of communication types, performs error detection of incoming data based on an encoding format defined by each of the communication types; and a type identification portion that identifies, among the plurality of communication types, a communication type in which error information is not detected by the error detection portion as a communication type of the incoming data.

10 Claims, 13 Drawing Sheets

IC CARD, INFORMATION PROCESSING DEVICE, COMMUNICATION TYPE IDENTIFICATION METHOD, AND PROGRAM

CROSS REFERENCES TO RELATED APPLICATION(S)

The present invention contains subject matter related to Japanese Patent Application JP 2007-299794 filed in the Japan Patent Office on Nov. 19, 2007, the entire contents of which being incorporated herein by reference.

BACKGROUND OF THE INVENTION

1. Field of the Invention

The present invention relates to an IC card, an information processing device, a communication type identification method, and a program.

2. Description of the Related Art

In recent years, mobile telephones and mobile information terminals equipped with a non-contact type integrated circuit (IC) card or a non-contact type IC chip, and communication devices and information processing devices equipped with a reader/writer function to perform non-contact communication with a non-contact IC card have come into widespread use. Hereinafter, these devices and instruments are also referred to as non-contact communication devices. A read/write unit (reader/writer) and a non-contact IC card can communicate with each other through close proximity communication by using a carrier wave with a specific frequency (for example, 13.56 MHz). For example, when a reader/writer transmits a command that causes a non-contact IC card to execute a predetermined processing, the non-contact IC card executes processing corresponding to the received command, and sends back the execution result as a response signal.

At this time, the reader/writer and the non-contact IC card can transmit a signal using a modulation technology called load modulation, which applies modulation to a carrier wave by changing a load of an antenna according to transmitted data. Normally, this signal is transmitted using an amplitude modulation method called amplitude shift keying (ASK). Further, this signal is transmitted based on a communication type that the reader/writer and the non-contact IC card can use to communicate with each other. For example, this signal is encoded by an encoding format defined by a predetermined communication type, then modulated with a modulation depth defined by the predetermined communication type, and is transmitted.

In this context, recently, attention has been focused on a technology related to a non-contact IC card compatible with a plurality of communication types. Particularly, there is a strong demand for development of a non-contact IC card that can identify, based on a signal received from a reader/writer when establishing communication, a communication type corresponding to the reader/writer accurately and at high speed.

As related technology, for example, a technology for establishing a communication type between a non-contact IC card and a reader/writer is described in Japanese Patent Application Publication No. JP-A-2003-233787. The key feature of this technology is that, when a modulation signal is received from a non-contact IC card or a reader/writer, a plurality of combinations of modulation types and encoding types are sequentially switched to search for a combination that matches the modulation signal.

As another example, a technology related to a non-contact IC card is described in Japanese Patent Application Publication No. JP-A-2005-94760. This technology concerns a technology that identifies a communication protocol of a received signal received from a reader/writer. More particularly, this technology assumes the use of communication protocols called International Standard ISO14443 type A and type B (hereinafter referred to as ISO14443-A, ISO14443-B). The key feature of this technology is that the communication protocol is identified based on header information of the received signal.

As yet another example, a technology related to a non-contact IC card is described in Japanese Patent Application Publication No. JP-A-2006-60363. This technology concerns a technology that identifies a communication type of a received signal received from a reader/writer when establishing communication with the reader/writer. More particularly, this technology assumes the use of ISO14443-A and ISO14443-B, or the IC card standard for high speed processing defined by Japan IC Card System Application Council (JICSAP). The key feature of this technology is that the communication protocol is identified based on header information of the received signal.

SUMMARY OF THE INVENTION

However, when the technology described in the above Japanese Patent Application Publication No. JP-A-2003-233787 is used, the identification speed is very slow. This is because, with respect to the modulation types and the encoding formats that correspond to a predetermined communication type, matching is confirmed for all the types and formats that can be expected. Also, when the technologies described in the above Japanese Patent Application Publication No. JP-A-2005-94760 or JP-A-2006-60363 are used, the identification speed is still slow because the communication type is identified after reading signal information from the head to the header. In addition, in these technologies, if a signal is mistakenly read in circumstances where communication is unstable, there is a high possibility that a mistaken determination will be made. Given this, in technologies that determine communication type, determination speed and determination accuracy are still big problems.

The present invention addresses the problems described above and provides an IC card, an information processing device, a communication type identification method, and a program that are new and improved and that are capable of identifying a communication type of incoming data received by non-contact communication at high speed and accurately, by using error information in identification.

In order to solve the above issue, according to an embodiment of the present invention, there is provided an IC card that is capable of identifying a communication type of incoming data received by non-contact communication. The IC card includes: an error detection portion that, for each of a plurality of communication types, performs error detection of the incoming data based on an encoding format defined by each of the communication types; and a type identification portion that identifies, among the plurality of communication types, a communication type in which error information is not detected by the error detection portion as a communication type of the incoming data.

The error detection portion may detect, as the error information, a code error and a frame error of the incoming data. With this configuration, accuracy in identifying the communication type can be further improved.

Further, the error detection portion may detect error information of the incoming data in units of codes until a predetermined number of codes is reached. With this configuration, accuracy in identifying the communication type can be further improved.

Further, the error detection portion may detect error information of the incoming data in units of codes until header information of the incoming data is reached. With this configuration, accuracy in identifying the communication type can be further improved.

The IC card may further include: a plurality of decoding portions which correspond to the encoding formats different from each other and which are capable of decoding encoded data of the corresponding encoding format; and a power saving control portion that reduces or stops power supply to the decoding portion corresponding to an encoding format in which the error information is detected. With this configuration, when the decoding portion, the power supply to which is reduced or stopped, is returned to operation, the decoding portion to be returned can be identified at a higher speed. Accordingly, a time required for the IC card itself to shift to a reception waiting state can be shortened.

In order to solve the above issue, according to another embodiment of the present invention, there is provided an information processing device equipped with the above-described IC card. Further, the information processing device may be a mobile telephone equipped with a call function.

In order to solve the above issue, according to another embodiment of the present invention, there is provided a method for identifying a communication type of incoming data received by non-contact communication. This method is a communication type identification method that includes the steps of: performing, for each of a plurality of communication types, error detection of the incoming data based on an encoding format defined by each of the communication types; and identifying, among the plurality of communication types, a communication type in which error information is not detected in the step of performing error detection as a communication type of the incoming data. With this method, speed and accuracy in identifying the communication type can be further improved.

In order to solve the above issue, according to another embodiment of the present invention, there is provided a program that causes a computer to executes a function to identify a communication type of incoming data received by non-contact communication. This program is a program including instructions that command a computer to execute the functions of: performing, for each of a plurality of communication types, error detection of the incoming data based on an encoding format defined by each of the communication types; and identifying, among the plurality of communication types, a communication type in which error information is not detected by the function of performing error detection as a communication type of the incoming data. Furthermore, a storage medium storing the program can also be provided. With this configuration, speed and accuracy in identifying the communication type can be further improved.

According to the embodiments of the present invention described above, the communication type of incoming data received by non-contact communication can be identified at a higher speed and more accurately by using error information in identification.

DETAILED DESCRIPTION OF THE PREFERRED EMBODIMENTS

Figure 1:
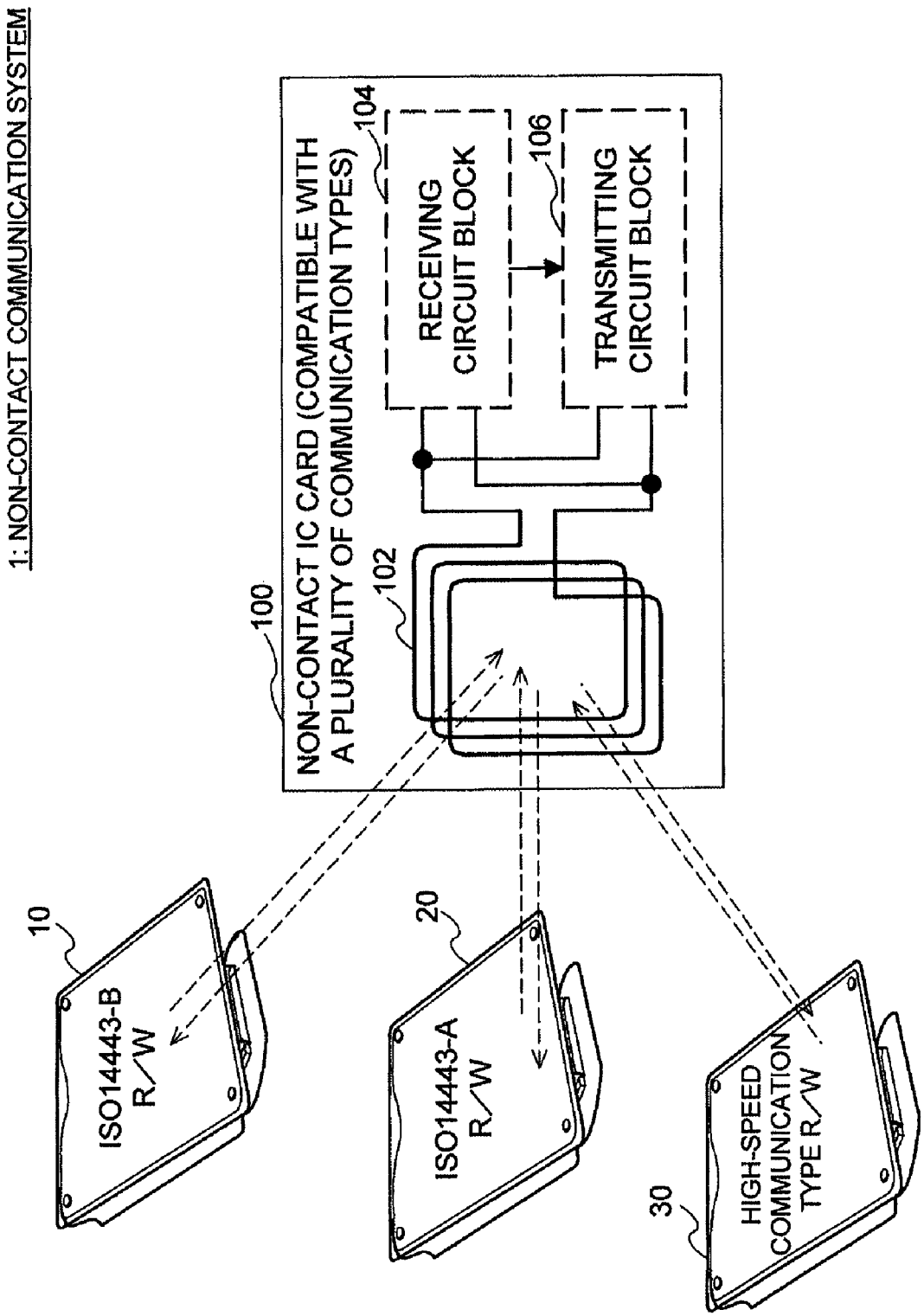
FIG. 1 is an explanatory diagram that shows an example of a system configuration according to a first embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

First Embodiment

Hereinafter, a first embodiment of the present invention will be described. A feature of this embodiment is that a communication type of a signal received from a reader/writer is identified based on error information of the signal. Further, another feature of this embodiment is that a code error is detected as the error information. Hereinafter, a device and a method according to this embodiment will be described focusing on these features.

Overall Configuration of the System

First, an overall configuration of a non-contact communication system 1 according to this embodiment will be described with reference to FIG. 1. FIG. 1 is an explanatory diagram that shows an example of a system configuration according to this embodiment. Note that the system configuration is schematically illustrated, for convenience of explanation, as an example of a system configuration to which this embodiment can be applied. However, the system configuration of this embodiment is not limited to this.

As shown in FIG. 1, the non-contact communication system 1 includes, for example, a plurality of reader/writers 10, 20, 30 and a non-contact IC card 100.

The reader/writer 10 is, for example, a reader/writer compatible with a communication type defined by ISO14443-B. Similarly, the reader/writer 20 is, for example, a reader/writer compatible with a communication type defined by ISO14443-A. Further, the reader/writer 30 is, for example, a reader/writer compatible with a communication type of an IC card standard for high speed processing as defined by Japan IC Card System Application Council (JICSAP).

The non-contact IC card 100 is, for example, a non-contact IC card compatible with a plurality of communication types, and is compatible with all or some of ISO14443-A, ISO14443-B, and the IC card standard for high speed processing. The non-contact IC card 100 may take the form of a mobile telephone, an information processing device, or other electronics devices provided with the function of the non-contact IC card 100. However, in the following description, the non-contact type IC card 100 will be explained as an example.

The main elements of the non-contact IC card 100 are an antenna 102, a receiving circuit block 104 and a transmitting circuit block 106. The receiving circuit block 104 is capable of receiving signals of the above-described plurality of communication types, and has a function of identifying a communication type of a received signal. When the receiving circuit block 104 identifies the communication type, the non-contact IC card 100 can communicate with the reader/writer with which a communication path is established, according to the identified communication type.

For example, when the non-contact IC card 100 receives a signal from the reader/writer 20, the receiving circuit block 104 of the non-contact IC card 100 identifies the communication type of the signal as ISO14443-A. Then, based on the standard of ISO14443-A, the transmitting circuit block 106 of the non-contact IC card 100 transmits a signal, or the receiving circuit block 104 receives a signal. More specifically, the transmitting circuit block 106 complies with the ISO14443-A type, and encodes data using the encoding format defined by the ISO14443-A type. Then, the transmitting circuit block 106 modulates the encoded data with the modulation depth defined by the type, and transmits the modulated data. Meanwhile, the receiving circuit block 104 complies with the ISO14443-A type, demodulates the received signal with the modulation depth defined by the ISO14443-A type, and decodes the demodulated data with the encoding format defined by the type.

As described above, when the communication type of the received signal is identified, the non-contact IC card 100 and the reader/writer can communicate with each other according to the identified communication type. Hereinafter, a functional configuration related to a communication type identification function of the non-contact IC card 100 will be described.

Functional Configuration of the Non-Contact IC Card 100

Figure 2:
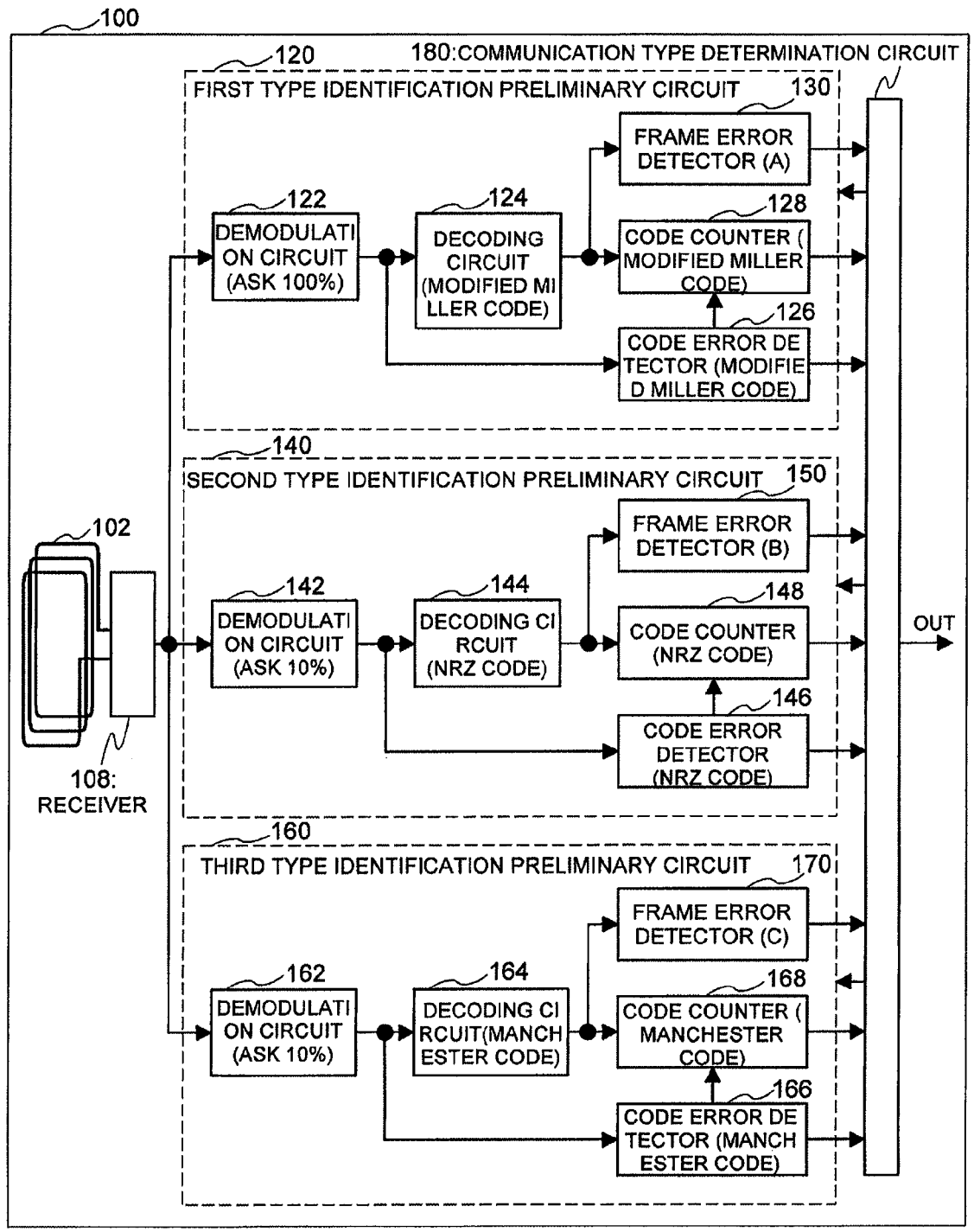
FIG. 2 is an explanatory diagram that shows a functional configuration of a non-contact IC card according to the first embodiment.

Next, a functional configuration of the non-contact IC card 100 according to this embodiment will be described with reference to FIG. 2. FIG. 2 is an explanatory diagram that shows the functional configuration of the non-contact IC card 100 according to this embodiment.

As shown in FIG. 2, the main elements of the non-contact IC card 100 are the antenna 102, a receiver 108, a first type identification preliminary circuit 120, a second type identification preliminary circuit 140, a third type identification preliminary circuit 160, and a communication type determination circuit 180.

First Type Identification Preliminary Circuit 120

First, the first type identification preliminary circuit 120 will be described. The first type identification preliminary circuit 120 is mainly formed by a demodulation circuit 122, a decoding circuit 124, a code error detector 126, a code counter 128 and a frame error detector 130. Note that, for convenience of explanation, it is assumed that the first type corresponds to the ISO14443-A type, the modulation type is defined as ASK 100%, and the encoding format is defined as a modified Miller code. However, it will bet is readily apparent that the technical scope of this embodiment is not limited to this configuration.

First, the modulation signal received by the receiver 108 via the antenna 102 is input to the demodulation circuit 122. The demodulation circuit 122 binarizes the input modulation signal and demodulates it with a predetermined modulation depth. For example, the demodulation circuit 122 can demodulate an ASK modulation signal that utilizes an amplitude modulation of 100%. Then, the data demodulated by the demodulation circuit 122 is input to the decoding circuit 124 and the code error detector 126.

The code error detector 126 determines whether or not each code of the input data is correct as a code of a predetermined encoding format. If it is determined that the code of the input data is not correct (abnormal) as the code of the predetermined encoding format, the code error detector 126 outputs a code error. For example, the code error detector 126 determines whether or not each code of the input data is correct as a modified Miller code. If it is determined that the code of the input data is not correct (abnormal), the code error detector 126 can output a code error. The code error output from the code error detector 126 is input to the code counter 128 and the communication type determination circuit 180.

The decoding circuit 124 decodes the input data based on a predetermined encoding format. For example, the decoding circuit 124 can decode the data encoded by the modified Miller code. Then, the data decoded by the decoding circuit 124 is input to the frame error detector 130 and the code counter 128. The frame error detector 130 is a device that detects an error relating to a data frame (hereinafter referred to as a frame error) defined by a predetermined communication type (the first type). For example, the frame error detector 130 performs a parity check and a cyclic redundancy check (CRC) of the input data to detect a parity error and a CRC error. Then, the frame error detected by the frame error detector 130 is input to the communication type determination circuit 180.

The code counter 128 is a device that counts the number of codes during a predetermined period using a code sampling clock of the predetermined communication type (the first type). The code counter 128 counts the number of codes in units of bits from the head of the input data, and resets the counted number of codes to 0 when the code error detector 126 detects a code error. When the code counter 128 completes the count of the number of the codes during the predetermined period, it sends a completion notification to the communication type determination circuit 180. Note that a counting method of the number of codes will be described later.

Second Type Identification Preliminary Circuit 140

Next, the second type identification preliminary circuit 140 will be described. The second type identification preliminary circuit 140 is mainly formed by a demodulation circuit 142, a decoding circuit 144, a code error detector 146, a code counter 148 and a frame error detector 150. Note that, for convenience of explanation, it is assumed that the second type corresponds to the ISO14443-B type, the modulation type is defined as ASK 10%, and the encoding format is defined as a non return to zero (NRZ) code. However, it will be readily apparent that the technical scope of this embodiment is not limited to this configuration.

First, the modulation signal received by the receiver 108 via the antenna 102 is input to the demodulation circuit 142. The demodulation circuit 142 binarizes the input modulation signal and demodulates it with a predetermined modulation depth. For example, the demodulation circuit 142 can demodulate an ASK modulation signal that utilizes an amplitude modulation of 10%. Then, the data demodulated by the demodulation circuit 142 is input to the decoding circuit 144 and the code error detector 146.

The code error detector 146 determines whether or not each code of the input data is correct as a code of a predetermined encoding format. If it is determined that the code of the input data is not correct (abnormal) as the code of the predetermined encoding format, the code error detector 146 outputs a code error. For example, the code error detector 146 determines whether or not each code of the input data is correct as an NRZ code. If it is determined that the code of the input data is not correct (abnormal), the code error detector 146 outputs a code error. The code error output from the code error detector 146 is input to the code counter 148 and the communication type determination circuit 180.

The decoding circuit 144 decodes the input data based on a predetermined encoding format. For example, the decoding circuit 144 can decode the data encoded by the NRZ code. Then, the data decoded by the decoding circuit 144 is input to the frame error detector 150 and the code counter 148. The frame error detector 150 is a device that detects an error, such as a frame error defined by a predetermined communication type (the second type). For example, the frame error detector 150 detects an error of the input data, such as a character error, a guard time error, a start of frame (SOF) error, an end of file (EOF) error and a CRC error. Then, the frame error detected by the frame error detector 150 is input to the communication type determination circuit 180.

The code counter 148 is a device that counts the number of codes during a predetermined period using a code sampling clock of the predetermined communication type (the second type). The code counter 148 counts the number of codes in units of bits from the head of the input data, and resets the counted number of codes to 0 when the code error detector 146 detects a code error. When the code counter 148 completes the count of the number of the codes during the predetermined period, it sends a completion notification to the communication type determination circuit 180. Note that the counting method of the number of codes will be described later.

Third Type Identification Preliminary Circuit 160

Next, the third type identification preliminary circuit 160 will be described. The third type identification preliminary circuit 160 is mainly formed by a demodulation circuit 162, a decoding circuit 164, a code error detector 166, a code counter 168 and a frame error detector 170. Note that, for convenience of explanation, it is assumed that the third type corresponds to the IC card standard for high speed processing, the modulation type is defined as ASK 10%, and the encoding format is defined as a Manchester code. However, it will be readily apparent that the technical scope of this embodiment is not limited to this configuration.

First, the modulation signal received by the receiver 108 via the antenna 102 is input to the demodulation circuit 162. The demodulation circuit 162 binarizes the input modulation signal and demodulates it with a predetermined modulation depth. For example, the demodulation circuit 162 can demodulate an ASK modulation signal that utilizes an amplitude modulation of 10%. Then, the data demodulated by the demodulation circuit 162 is input to the decoding circuit 164 and the code error detector 166.

The code error detector 166 determines whether or not each code of the input data is correct as a code of a predetermined encoding format. If it is determined that the code of the input data is not correct (abnormal) as the code of the predetermined encoding format, the code error detector 166 outputs a code error. For example, the code error detector 166 determines whether or not each code of the input data is correct as the Manchester code. If it is determined that the code of the input data is not correct (abnormal), the code error detector 166 outputs a code error. The code error output from the code error detector 166 is input to the code counter 168 and the communication type determination circuit 180.

The decoding circuit 164 decodes the input data based on a predetermined encoding format. For example, the decoding circuit 164 decodes the data encoded by the Manchester code. Then, the data decoded by the decoding circuit 164 is input to the frame error detector 170 and the code counter 168. The frame error detector 170 is a device that detects an error, such as a frame error defined by a predetermined communication type (the third type). For example, the frame error detector 170 detects an error of the input data, such as a synchronization (SYNC) code error or a CRC error. Then, the frame error detected by the frame error detector 170 is input to the communication type determination circuit 180.

The code counter 168 is a device that counts the number of codes during a predetermined period using a code sampling clock of the predetermined communication type (the third type). The code counter 168 counts the number of codes in units of bits from the head of the input data, and resets the counted number of codes to 0 when the code error detector 166 detects a code error. When the code counter 168 completes the count of the number of the codes during the predetermined period, it sends a completion notification to the communication type determination circuit 180. Note that the counting method of the number of codes will be described later.

Communication Type Determination Circuit 180

The communication type determination circuit 180 is a device that identifies a communication type of a received signal based on code errors, frame errors, and completion notifications of the code counters that are input from the first type identification preliminary circuit 120, the second type identification preliminary circuit 140 and the third type identification preliminary circuit 160. The communication type determination circuit 180 selects the communication type corresponding to a circuit in which error information has not been detected from among the first type identification preliminary circuit 120, the second type identification preliminary circuit 140 and the third type identification preliminary circuit 160. Then, the communication type determination circuit 180 determines that the communication type of the reader/writer that has sent a signal is the communication type that is selected based on the error information output from each circuit. Further, the communication type determination circuit 180 may reduce the amount of power supplied to the circuit in which the error information has been detected, or stop the power supply to the circuit.

Note that, when the communication type determination circuit 180 selects the communication type, it may just refer to the code error as the error information output from each circuit, or may refer to both the code error and the frame error.

When the communication type determination circuit 180 just refers to the code error, it can determine the communication type at a higher speed. On the other hand, when the communication type determination circuit 180 refers to both the code error and the frame error, it can determine the communication type more accurately.

Communication Type Identification Process

Figure 3:
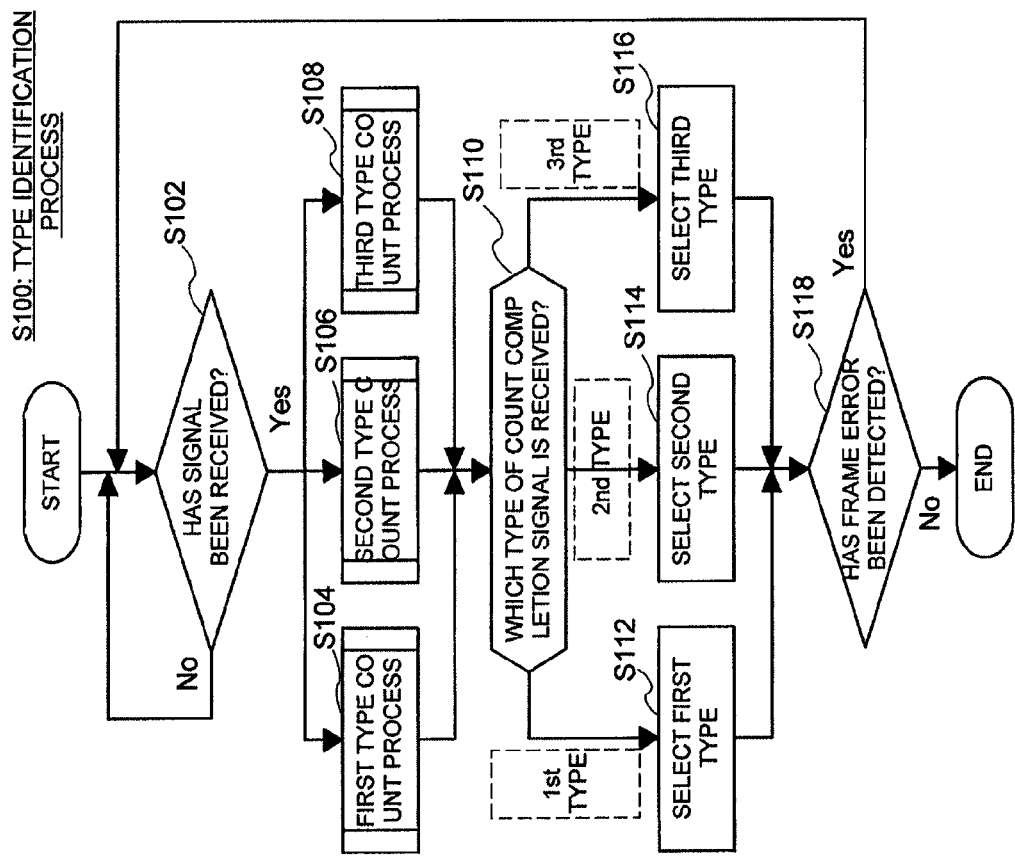
FIG. 3 is a flowchart that shows the flow of a type identification process according to the first embodiment.

A communication type identification process S100 performed by the non-contact IC card 100 will now be described with reference to FIG. 3. FIG. 3 is a flowchart that shows the flow of the communication type identification process S100 performed by the non-contact IC card 100.

As shown in FIG. 3, the non-contact IC card 100 determines whether or not a signal has been received (S102). When no signal has been received, the non-contact IC card 100 maintains a reception waiting state while confirming signal reception. On the other hand, when a signal has been received, the non-contact IC card 100 proceeds to processes at steps S104, S106 and S108. In this case, the non-contact IC card 100 performs, for example, the processes at steps S104, S106 and S108 in parallel.

At step S104, the non-contact IC card 100 performs a count process of the first type (S104). Similarly, at step S106, the non-contact IC card 100 performs a count process of the second type (S106). Further, at step S108, the non-contact IC card 100 performs a count process of the third type (S108). Next, these count processes will be described in more detail with reference to FIG. 4.

Count Processes

As an example, the count process of the first type S104 will be described. Note that the count process of the second type S106 and the count process of the third type S108 are also performed in a similar manner.

Figure 4:
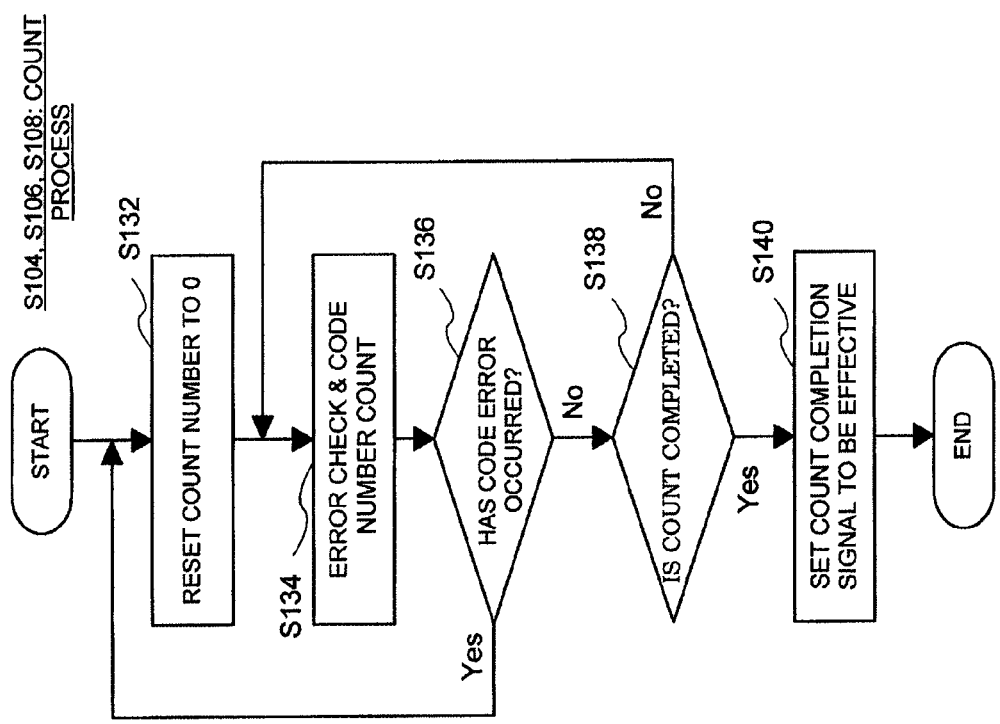
FIG. 4 is a flowchart that shows the flow of a count process according to the first embodiment.

As shown in FIG. 4, first, the non-contact IC card 100 resets the count number to 0 (S132). Then, the code error detector 126 of the non-contact IC card 100 performs an error check, and the code counter 128 of the non-contact IC card 100 increments the count number indicating the number of the checked codes (S134). Then, the code error detector 126 of the non-contact IC card 100 determines whether or not a code error has occurred (S136). When no code error has occurred, the non-contact IC card 100 proceeds to the process at step S138. When a code error has occurred, the non-contact IC card 100 proceeds to the process at step S132, and shifts to the reception waiting state.

At step S138, the non-contact IC card 100 determines whether to end the count process based on whether or not the current count number has reached a predetermined number (S138). When the count number has reached the predetermined number and the count process is ended, the non-contact IC card 100 proceeds to the process at step S140. On the other hand, when the count number is less than the predetermined number and the count process is continued, the non-contact IC card 100 proceeds to the process at step S134. At step S140, the code counter 128 of the non-contact IC card 100 sets a count completion signal to be effective and notifies the communication type determination circuit 180 of the count completion (S140), thereby completing the count process. The above-described count process is also performed for the second type and the third type.

Next, FIG. 3 will be referred to again. At steps S104, S106 and S108, the count processes of the first type, the second type and the third type are performed, and the count completion signals are input to the communication type determination circuit 180. Then, the non-contact IC card 100 proceeds to the process at step S110.

At step S110, the non-contact IC card 100 determines which type of count completion signal is received (S110). At this time, in a case where a plurality of count completion signals are input to the communication type determination circuit 180, the non-contact IC card 100 selects the type corresponding to the first input count completion signal.

When the count completion signal of the first type is received, the non-contact IC card 100 proceeds to the process at step S112. When the count completion signal of the second type is received, the non-contact IC card 100 proceeds to the process at step S114. When the count completion signal of the third type is received, the non-contact IC card 100 proceeds to the process at step S116. Note that frame errors from the frame error detectors 130, 150 and 170 are input to the communication type determination circuit 180.

At step S112, the non-contact IC card 100 selects the communication type of the first type (S112), and proceeds to the process at step S118. Similarly, at step S114, the non-contact IC card 100 selects the communication type of the second type (S114), and proceeds to the process at step S118. Similarly, at step S116, the non-contact IC card 100 selects the communication type of the third type (S116), and proceeds to the process at step S118. In this manner, the non-contact IC card 100 selects the communication type in accordance with the code error.

At step S118, the non-contact IC card 100 determines whether or not a frame error has been detected by the frame error detector corresponding to the selected communication type (S118). If a frame error has been detected, the non-contact IC card 100 proceeds to the process at step S102 and shifts to the reception waiting state. If a frame error has not been detected, the non-contact IC card 100 selects one of the communication types selected at steps S112, S114 and S116, and ends the type identification process S100.

Specific Examples of the Count Process

Figure 5:
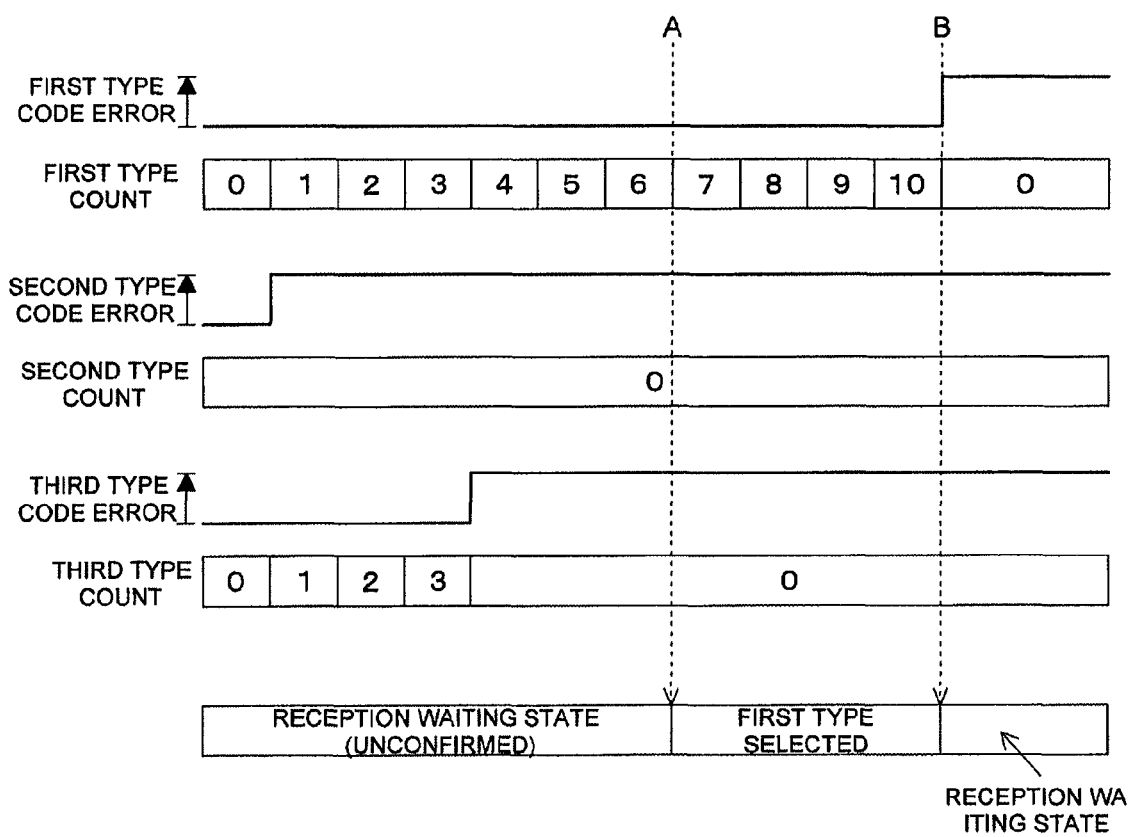
FIG. 5 is an explanatory diagram that shows a state transition of the non-contact IC card according to the first embodiment.

Here, a state transition of the non-contact IC card 100 during the above-described count process will be briefly described with reference to FIG. 5. FIG. 5 is an explanatory diagram that shows the state transition of the non-contact IC card 100 in a case where a code error has occurred during code counting. FIG. 5 shows, from the top, the first type code error detection state (H: detection, L: non-detection), the first type code counter, the second type code error detection state, the second type code counter, the third type code error detection state, the third type code counter, and the state of the non-contact IC card 100.

First, attention will be focused on explaining the first type code error detection state, and the first type code counter. When the non-contact IC card 100 receives a signal, the code counter 128 starts the code count. As shown in FIG. 5, when the first type code error detection state is a non-detection state (L), the code counter 128 continuously counts the number of codes. In the example shown in FIG. 5, until point B is reached, the code count of the first type is continued.

Next, attention will be focused on explaining the second type code error detection state, and the second type code counter. When the non-contact IC card 100 receives a signal, the code counter 148 starts the code count. As shown in FIG. 5, the second type code error detection state rapidly changes to the detection state (H) of the code error, and the detection state (H) continues for a while. Therefore, the count number of the code counter 148 remains zero. Note that, while the count number is zero, the waiting state of the second type identification preliminary circuit 140 is maintained.

Next, attention will be focused on explaining the third type code error detection state, and the third type code counter. When the non-contact IC card 100 receives a signal, the code counter 168 starts the code count. As shown in FIG. 5, the third type code error detection state is the non-detection state (L) while the count number changes from 0 to 3. However, at the time point when the count number exceeds 3, the third type code error detection state changes to the detection state (H). Therefore, the code counter 168 resets the count number of codes to 0. At this time, the state of the third type identification preliminary circuit 160 shifts to a reception waiting state.

For example, in a case where a predetermined count number (a predetermined period) that indicates a timing at which the communication type is determined is set to 6 (point A), the communication type determination circuit 180 of the non-contact IC card 100 determines that the first type, the count number of which has first reached the predetermined count number, is the communication type corresponding to the received signal. That is, the non-contact IC card 100 selects the communication type in which no error is detected during the predetermined period.

Hereinabove, the functional configuration of the non-contact IC card 100 according to the first embodiment of the present invention, the communication type identification method that is realized by the function of the non-contact IC card 100, and the like have been described in detail. As described above, the non-contact IC card 100 can perform one of or both the detection processes of the code error and the frame error of the received signal, and select the communication type in accordance with the detection/non-detection state of the error information. As a result, the non-contact IC card 100 can identify the communication type at a higher speed and more accurately, as compared to a device or a method in which the communication type is identified after reading header information.

Further, by saving the power supply to the circuit corresponding to the communication type in which an error has been detected, it is possible to reduce the power consumption of the non-contact IC card 100. Regarding this power saving function, transition to a power saving state and return from the power saving state are performed at high speed as a result of high speed identification of the communication type. Therefore, the power consumption can be significantly reduced, and the return time to a response possible state is shortened.

Note that the above-described decoding circuit 124 is one example of a decoding portion. The above-described code error detector 126 is one example of an error detection portion. The above-described code error detector 130 is one example of the error detection portion. The above-described communication type determination circuit 180 is one example of a type identification portion and a power saving control portion. The above-described code error is one example of error information. The above-described frame error is one example of the error information.

Second Embodiment

Next, a second embodiment of the present invention will be described. The main difference between the second embodiment and the first embodiment relates to the method for determining a communication type determination timing. In the first embodiment, the code counter determines the communication type determination timing. On the other hand, in the second embodiment, the communication type is determined when the header information included in the received signal is confirmed. Note that, in the below description, structural elements that have substantially the same function and structure as those in the first embodiment will be described by denoting the same reference numerals.

Functional Configuration of a Non-Contact IC Card 200

Figure 6:
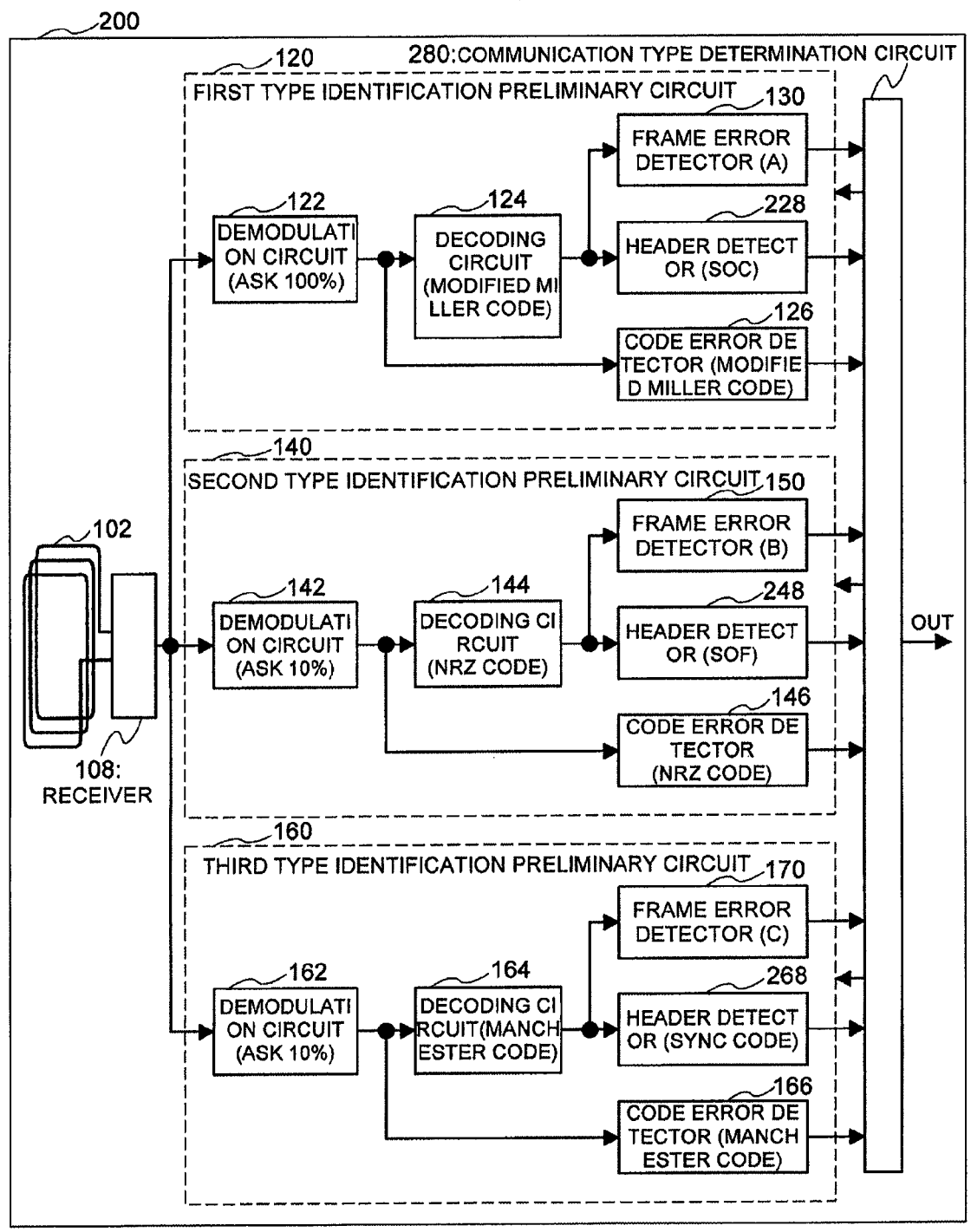
FIG. 6 is an explanatory diagram that shows a functional configuration of a non-contact IC card according to a second embodiment of the present invention.

Next, a functional configuration of the non-contact IC card 200 according to this embodiment will be described with reference to FIG. 6. FIG. 6 is an explanatory diagram that shows the functional configuration of the non-contact IC card 200 according to this embodiment.

As shown in FIG. 6, the non-contact IC card 200 is mainly formed by the antenna 102, the receiver 108, the first type identification preliminary circuit 120, the second type identification preliminary circuit 140, the third type identification preliminary circuit 160, and a communication type determination circuit 280.

First Type Identification Preliminary Circuit 120

First, the first type identification preliminary circuit 120 will be described. The first type identification preliminary circuit 120 is mainly formed by the demodulation circuit 122, the decoding circuit 124, the code error detector 126, a header detector 228, and the frame error detector 130. Note that, for convenience of explanation, it is assumed that the first type corresponds to the ISO14443-A type, the modulation type is defined as ASK 100%, and the encoding format is defined as a modified Miller code. It will be readily apparent, however, that the technical scope of this embodiment is not limited to this configuration.

First, the modulation signal received by the receiver 108 via the antenna 102 is input to the demodulation circuit 122. The demodulation circuit 122 binarizes the input modulation signal and demodulates it with a predetermined modulation depth. For example, the demodulation circuit 122 can demodulate an ASK modulation signal that utilizes an amplitude modulation of 100%. Then, the data demodulated by the demodulation circuit 122 is input to the decoding circuit 124 and the code error detector 126.

The code error detector 126 determines whether or not each code of the input data is correct as a code of a predetermined encoding format. If it is determined that the code of the input data is not correct (abnormal) as the code of the predetermined encoding format, the code error detector 126 outputs a code error. For example, the code error detector 126 determines whether or not each code of the input data is correct as a modified Miller code. If it is determined that the code of the input data is not correct (abnormal), the code error detector 126 outputs a code error. The code error output from the code error detector 126 is input to the communication type determination circuit 280.

The decoding circuit 124 decodes the input data based on a predetermined encoding format. For example, the decoding circuit 124 decodes the data encoded by the modified Miller code. Then, the data decoded by the decoding circuit 124 is input to the frame error detector 130 and the header detector 228. The frame error detector 130 is a device that detects an error relating to a data frame (hereinafter referred to as a frame error) defined by a predetermined communication type (the first type). For example, the frame error detector 130 performs a parity check and a CRC check of the input data to detect a parity error and a CRC error. Then, the frame error detected by the frame error detector 130 is input to the communication type determination circuit 280.

The header detector 228 is a device that detects header information of the input data. When the header detector 228 detects header information, a detection notice (a header confirmation signal) is input to the communication type determination circuit 280. In other words, the header detector 228 is a device that notifies the communication type determination circuit 280 of the detection time point of the header information, which is the timing at which the communication type is identified. For example, the header detector 228 confirms the code of the input data until the SOC of the input data is detected. When the SOC is detected, the header detector 228 sends the header confirmation signal to the communication type determination circuit 280. Note that the header confirmation process will be described later.

Second Type Identification Preliminary Circuit 140

Next, the second type identification preliminary circuit 140 will be described. The second type identification preliminary circuit 140 is mainly formed by the demodulation circuit 142, the decoding circuit 144, the code error detector 146, a header detector 248 and the frame error detector 150. Note that, for convenience of explanation, it is assumed that the second type corresponds to the ISO14443-B type, the modulation type is defined as ASK 10%, and the encoding format is defined as a NRZ code. However, it will be readily apparent that the technical scope of this embodiment is not limited to this configuration.

First, the modulation signal received by the receiver 108 via the antenna 102 is input to the demodulation circuit 142. The demodulation circuit 142 binarizes the input modulation signal and demodulates it with a predetermined modulation depth. For example, the demodulation circuit 142 demodulates an ASK modulation signal that utilizes an amplitude modulation of 10%. Then, the data demodulated by the demodulation circuit 142 is input to the decoding circuit 144 and the code error detector 146.

The code error detector 146 determines whether or not each code of the input data is correct as a code of a predetermined encoding format. If it is determined that the code of the input data is not correct (abnormal) as the code of the predetermined encoding format, the code error detector 146 outputs a code error. For example, the code error detector 146 determines whether or not each code of the input data is correct as the NRZ code. If it is determined that the code of the input data is not correct (abnormal), the code error detector 146 outputs a code error. The code error output from the code error detector 146 is input to the communication type determination circuit 280.

The decoding circuit 144 decodes the input data based on a predetermined encoding format. For example, the decoding circuit 144 decodes the data encoded by the NRZ code. Then, the data decoded by the decoding circuit 144 is input to the frame error detector 150 and the code counter 148. The frame error detector 150 is a device that detects an error, such as a frame error defined by a predetermined communication type (the second type). For example, the frame error detector 150 detects an error of the input data, such as a character error, a guard time error, an SOF error, an EOF error and a CRC error. Then, the frame error detected by the frame error detector 150 is input to the communication type determination circuit 280.

The header detector 248 is a device that detects header information of the input data. When the header detector 248 detects header information, a detection notice (a header confirmation signal) is input to the communication type determination circuit 280. In other words, the header detector 248 is a device that notifies the communication type determination circuit 280 of the detection time point of the header information, which is the timing at which the communication type is identified. For example, the header detector 248 confirms the code of the input data until the SOF of the input data is detected. When the SOF is detected, the header detector 248 sends the header confirmation signal to the communication type determination circuit 280. Note that the header confirmation process will be described later.

Third Type Identification Preliminary Circuit 160

Next, the third type identification preliminary circuit 160 will be described. The third type identification preliminary circuit 160 is mainly formed by the demodulation circuit 162, the decoding circuit 164, the code error detector 166, a header detector 268 and the frame error detector 170. Note that, for convenience of explanation, it is assumed that the third type corresponds to the IC card standard for high speed processing, the modulation type is defined as ASK 10%, and the encoding format is defined as a Manchester code. It will be readily apparent, however, that the technical scope of this embodiment is not limited to this configuration.

First, the modulation signal received by the receiver 108 via the antenna 102 is input to the demodulation circuit 162. The demodulation circuit 162 binarizes the input modulation signal and demodulates it with a predetermined modulation depth. For example, the demodulation circuit 162 demodulates an ASK modulation signal that utilizes an amplitude modulation of 10%. Then, the data demodulated by the demodulation circuit 162 is input to the decoding circuit 164 and the code error detector 166.

The code error detector 166 determines whether or not each code of the input data is correct as a code of a predetermined encoding format. If it is determined that the code of the input data is not correct (abnormal) as the code of the predetermined encoding format, the code error detector 166 outputs a code error. For example, the code error detector 166 determines whether or not each code of the input data is correct as the Manchester code. If it is determined that the code of the input data is not correct (abnormal), the code error detector 166 outputs a code error. The code error output from the code error detector 166 is input to the communication type determination circuit 280.

The decoding circuit 164 decodes the input data based on a predetermined encoding format. For example, the decoding circuit 164 decodes the data encoded by the Manchester code. Then, the data decoded by the decoding circuit 164 is input to the frame error detector 170 and the code counter 168. The frame error detector 170 is a device that detects an error, such as a frame error defined by a predetermined communication type (the third type). For example, the frame error detector 170 detects an error of the input data, such as an SYNC code error and a CRC error. Then, the frame error detected by the frame error detector 170 is input to the communication type determination circuit 280.

The header detector 268 is a device that detects header information of the input data. When the header detector 268 detects header information, a detection notice (a header confirmation signal) is input to the communication type determination circuit 280. In other words, the header detector 268 is a device that notifies the communication type determination circuit 280 of the detection time point of the header information, which is a timing at which the communication type is identified. For example, the header detector 268 confirms the code of the input data until the preamble and the SYNC code of the input data are detected. When the preamble and the SYNC code are detected, the header detector 268 sends the header confirmation signal to the communication type determination circuit 280. Note that the header confirmation process will be described later.

Communication Type Determination Circuit 280

The communication type determination circuit 280 is a device that identifies a communication type of a received signal based on code errors, frame errors, header confirmation signals and the like that are input from the first type identification preliminary circuit 120, the second type identification preliminary circuit 140 and the third type identification preliminary circuit 160. The communication type determination circuit 280 selects the communication type corresponding to a circuit in which error information has not been detected from among the first type identification preliminary circuit 120, the second type identification preliminary circuit 140 and the third type identification preliminary circuit 160. Then, the communication type determination circuit 280 determines that the communication type that is selected based on the error information output from each circuit is the communication type of the reader/writer. Further, the communication type determination circuit 280 may reduce the amount of power supplied to the circuit in which the error information has been detected, or stop the power supply to the circuit.

Note that, when the communication type determination circuit 280 selects the communication type, it may just refer to the code error as the error information output from each circuit, or may refer to both the code error and the frame error. When the communication type determination circuit 280 just refers to the code error, it can determine the communication type at a higher speed. On the other hand, when the communication type determination circuit 280 refers to both the code error and the frame error, it can determine the communication type more accurately.

Communication Type Identification Process

Figure 7:
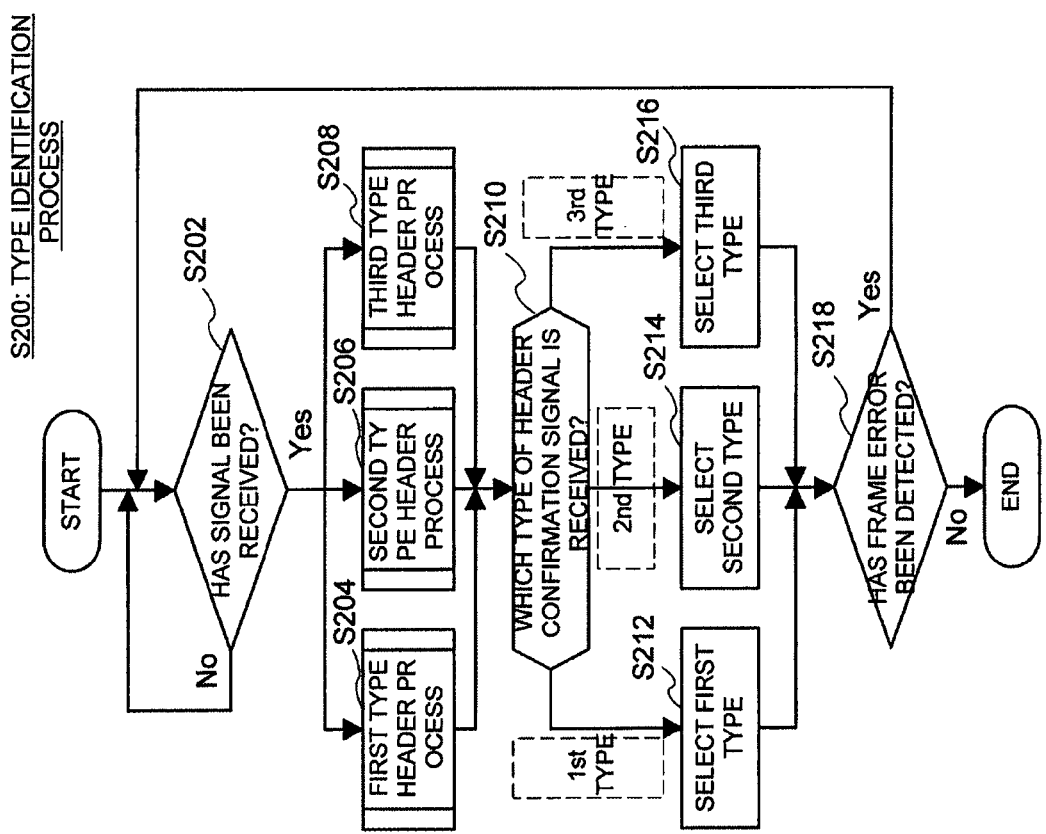
FIG. 7 is a flowchart that shows the flow of a type identification process according to the second embodiment.

A communication type identification process S200 performed by the non-contact IC card 200 will now be described with reference to FIG. 7. FIG. 7 is a flowchart that shows the flow of the communication type identification process S200 performed by the non-contact IC card 200.

As shown in FIG. 7, the non-contact IC card 200 determines whether or not a signal has been received (S202). When no signal has been received, the non-contact IC card 200 maintains a reception waiting state while confirming signal reception. On the other hand, when a signal has been received, the non-contact IC card 200 proceeds to the processes at steps S204, S206 and S208. In this case, the non-contact IC card 200 performs, for example, the processes at steps S204, S206 and S208 in parallel.

At step S204, the non-contact IC card 200 performs a header confirmation process of the first type (S204). Similarly, at step S206, the non-contact IC card 200 performs a header confirmation process of the second type (S206). Further, at step S208, the non-contact IC card 200 performs a header confirmation process of the third type (S208). Here, these header confirmation processes will be described in more detail with reference to FIG. 8.

Header Confirmation Process

As an example, the header confirmation process of the first type S204 will be described. Note that the header confirmation process of the second type S206 and the header confirmation process of the third type S208 are also performed in a similar manner.

Figure 8:
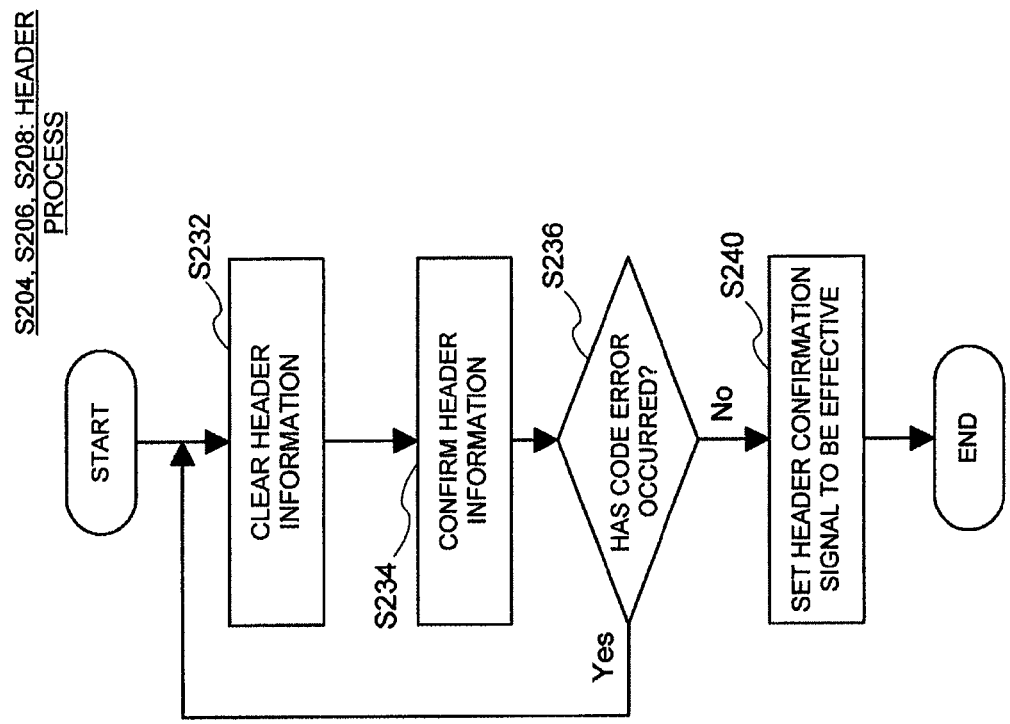
FIG. 8 is a flowchart that shows the flow of a header confirmation process according to the second embodiment.

As shown in FIG. 8, first, the non-contact IC card 200 clears header information (S232). Then, the non-contact IC card 200 confirms the header information (SOC) of the data input to the header detector 228 (S234). Then, the non-contact IC card 200 determines whether or not a code error has been detected by the code error detector 126 before the header information is detected (S236). When a code error has been detected, the non-contact IC card 200 proceeds to the process at step S232. On the other hand, when no code error has been detected, the non-contact IC card 200 proceeds to the process at step S240.

At step S240, the header detector 228 of the non-contact IC card 200 sends a header confirmation signal to the communication type determination circuit 280 (S240), thereby completing the header confirmation process. The above-described header confirmation process is also performed for the second type and the third type.

Next, FIG. 7 will be referred to again. At steps S204, S206 and S208, the header confirmation processes of the first type, the second type and the third type are performed, and the header confirmation signals are input to the communication type determination circuit 280. Then, the non-contact IC card 200 proceeds to the process at step S210.

At step S210, the non-contact IC card 200 determines which type of header confirmation signal has been received (S210). At this time, in a case where a plurality of header confirmation signals are input to the communication type determination circuit 280, the non-contact IC card 200 selects the communication type corresponding to the first input header confirmation signal.

When the header confirmation signal of the first type is received, the non-contact IC card 200 proceeds to the process at step S212. When the header confirmation signal of the second type is received, the non-contact IC card 200 proceeds to the process at step S214. When the header confirmation signal of the third type is received, the non-contact IC card 200 proceeds to the process at step S216. Note that frame errors are also input to the communication type determination circuit 280 from the frame error detectors 130, 150 and 170.

At step S212, the non-contact IC card 200 selects the communication type of the first type (S212), and proceeds to the process at step S218. Similarly, at step S214, the non-contact IC card 200 selects the communication type of the second type (S214), and proceeds to the process at step S218. Similarly, at step S216, the non-contact IC card 200 selects the communication type of the third type (S216), and proceeds to the process at step S218. In this manner, the non-contact IC card 200 selects the communication type in accordance with the code error.

At step S218, the non-contact IC card 200 determines whether or not a frame error has been detected by the frame error detector corresponding to the selected communication type (S218). If a frame error has been detected, the non-contact IC card 200 proceeds to the process at step S202 and shifts to a reception waiting state. If a frame error has not been detected, the non-contact IC card 200 selects one of the communication types selected at steps S212, S214 and S216, and ends the type identification process S200.

Specific Examples of the Header Confirmation Process

Figure 9:
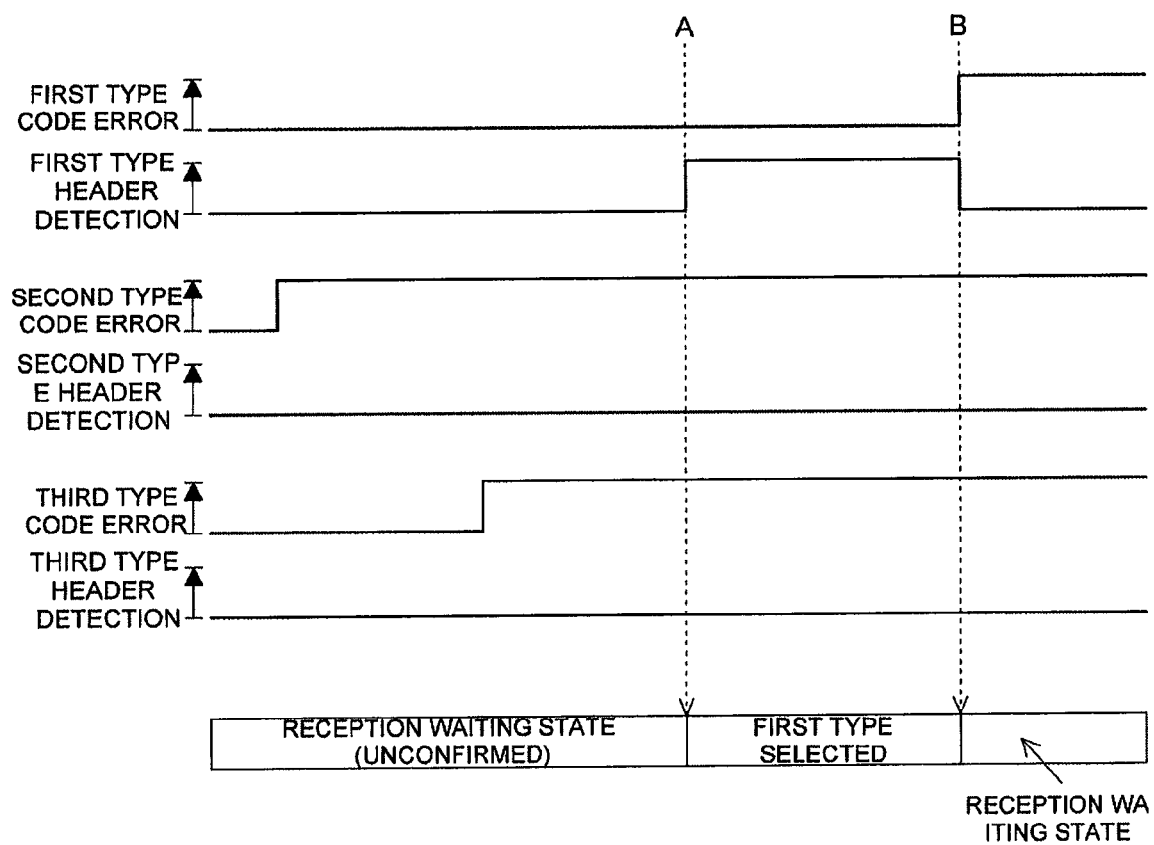
FIG. 9 is an explanatory diagram that shows a state transition of the non-contact IC card according to the second embodiment.

Here, a state transition of the non-contact IC card 200 during the above-described header confirmation process will be briefly described with reference to FIG. 9. FIG. 9 is an explanatory diagram that shows the state transition of the non-contact IC card 200 in a case where a code error has occurred during the header confirmation process. FIG. 9 shows, from the top, the first type code error detection state (H: detection, L: non-detection), the first type header detection state, the second type code error detection state, the second type header detection state, the third type code error detection state, the third type header detection state, and the state of the non-contact IC card 200.

First, attention will be focused on explaining the first type code error detection state, and the first type header detection state. When the non-contact IC card 200 receives a signal, the header detector 228 starts detection of header information. In the example of FIG. 9, until a time point (point A) when header information of the first type is detected, the first type code error detection state is a non-detection state (L).

Next, attention will be focused on explaining the second type code error detection state, and the second type header detection state. When the non-contact IC card 200 receives a signal, the header detector 248 starts detection of header information. In the example of FIG. 9, before the header information of the second type is detected, a code error of the second type is detected.

Next, attention will be focused on explaining the third type code error detection state, and the third type header detection state. When the non-contact IC card 200 receives a signal, the header detector 268 starts detection of header information. In the example of FIG. 9, before the header information of the third type is detected, a code error of the second type is detected.

In the example of FIG. 9, the communication type determination circuit 280 first receives a header confirmation signal of the first type (point A). Therefore, the communication type determination circuit 280 determines whether or not a code error of the first type is detected based on the output from the code error detector 126. In the example of FIG. 9, because a code error of the first type is not detected until point A, the communication type determination circuit 280 selects the first communication type. When a code error of the first type is detected (point B), the communication type determination circuit 280 clears the header information of the first type. In response to this, the non-contact IC card 200 shifts to the reception waiting state again.

Hereinabove, the functional configuration of the non-contact IC card 200 according to the second embodiment of the present invention, the communication type identification method that is realized by the function of the non-contact IC card 200, and the like have been described in detail. As described above, the non-contact IC card 200 can perform one of or both the detection processes of the code error and the frame error of the received signal, and select the communication type in accordance with the detection/non-detection state of the error information. Note that, the non-contact IC card 200 continues detection of the code error until a time point when header information is reached, and then performs identification of the communication type based on the detection result. Accordingly, the identification of the communication type can be performed more accurately than in the above-described first embodiment.

Further, by saving the power supply to the circuit corresponding to the communication type in which an error has been detected, it is possible to reduce the power consumption of the non-contact IC card 200. For example, by performing this power saving process immediately when the code error is detected, transition to a power saving state and return from the power saving state are performed at high speed. As a result, power consumption can be further significantly reduced, and the return time to a response possible state is shortened.

First Applied Example

An applied example (hereinafter referred to as a first applied example) that utilizes a combination of the configurations of the above-described first embodiment and second embodiment will now be described with reference to FIG. 10 and FIG. 11. The first applied example relates to a method for identifying a communication type just based on a code error.

Type Identification Process S300

A type identification process S300 according to this applied example will now be described with reference to FIG. 10. FIG. 10 is a flowchart that shows the flow of the type identification process S300 in a case where the communication type is identified just based on a code error.

Figure 10:
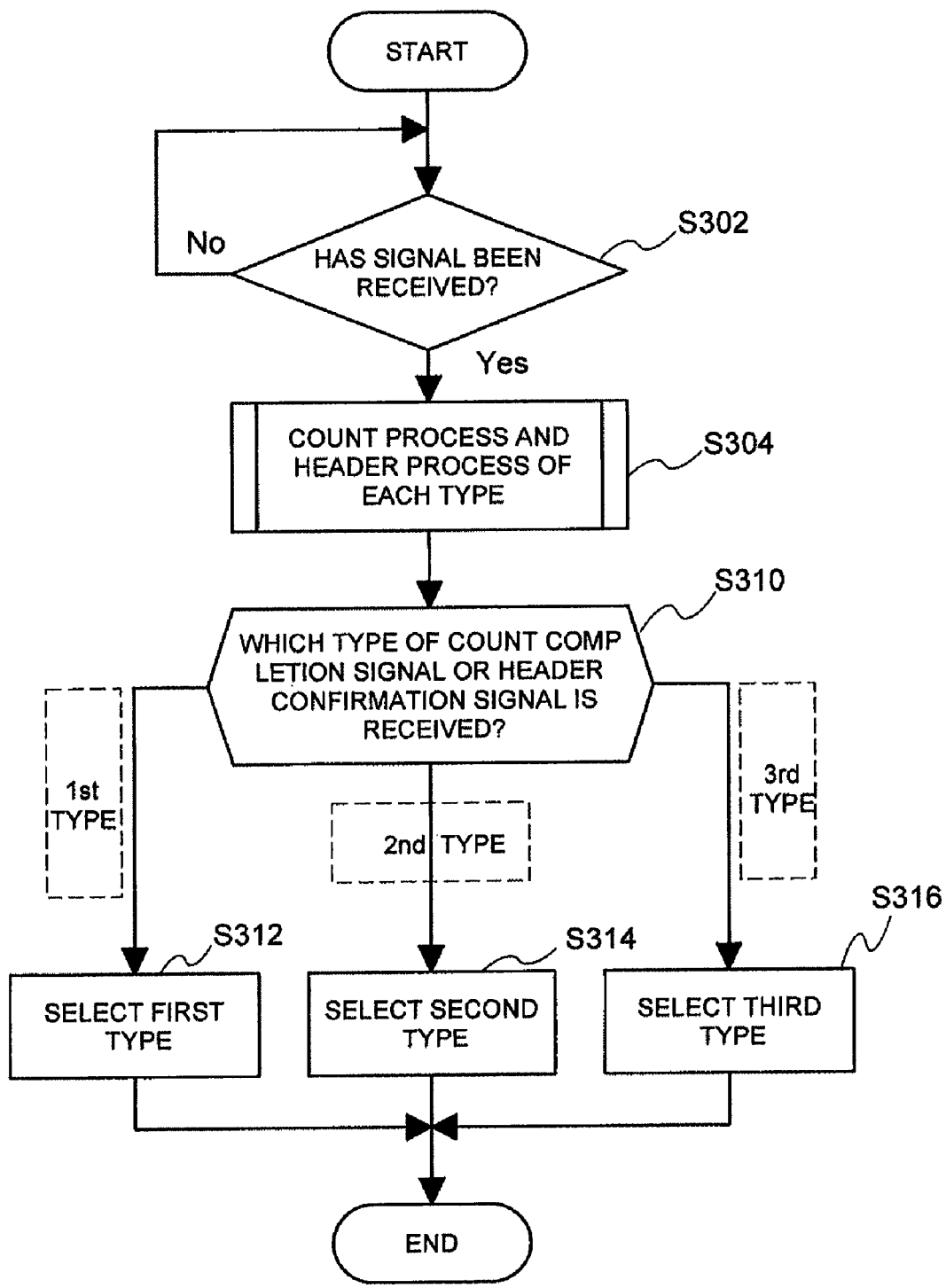
FIG. 10 is a flowchart that shows the flow of a type identification process according to an applied example of the present invention.

As shown in FIG. 10, a non-contact IC card maintains a reception waiting state while determining whether or not a signal has been received (S302). Then, the non-contact IC card performs a code count process and a header confirmation process corresponding to each type (S304). Then, the non-contact IC card determines which type of count completion signal or header confirmation signal is first output (S310). When the count completion signal or the header confirmation signal of the first type is output, the non-contact IC card proceeds to the process at step S312. When the count completion signal or the header confirmation signal of the second type is output, the non-contact IC card proceeds to the process at step S314. When the count completion signal or the header confirmation signal of the third type is output, the non-contact IC card proceeds to the process at step S316.

At step S312, the non-contact IC card selects the first communication type (S312), and ends the type identification process. At step S314, the non-contact IC card selects the second communication type (S314), and ends the type identification process. At step S316, the non-contact IC card selects the third communication type (S316), and ends the type identification process. In this manner, in this applied example, the detection result of the frame error is not utilized for communication type identification. Therefore, there is no need to provide a frame error detector, and the communication type identification process is performed at a higher speed.

Specific Example of the Type Identification Process

A specific example of the type identification process according to this applied example will be described with reference to FIG. 11. FIG. 11 is an explanatory diagram that shows a specific example of the type identification process according to this applied example. FIG. 11 shows, from the top, the first type code error detection state (H: detection, L: non-detection), the second type code error detection state, the third type code error detection state, and the type identification result. It is assumed that a period until point A in FIG. 11, and a period between point B and point C are type identification periods.

Figure 11:
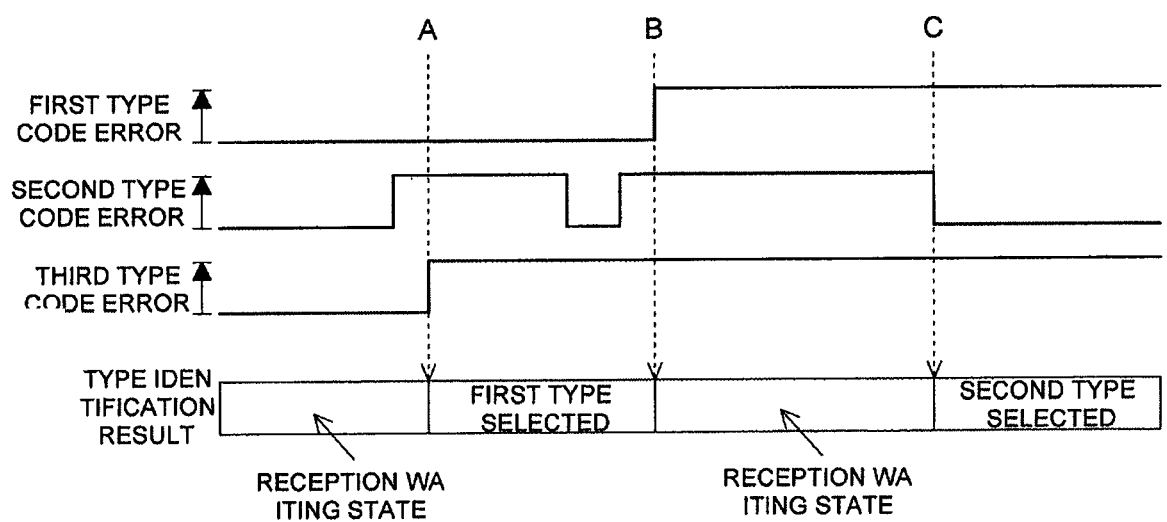
FIG. 11 is an explanatory diagram that shows a state transition of a non-contact IC card according to the applied example.

In the example of FIG. 11, at point A, the code error of the first type has not been detected, the code error of the second type has been detected, and the code error of the third type has been detected. That is, at point A, only the code error of the first type has not been detected. Accordingly, the first type is selected. Once the first type is selected, until a code error of the first type is detected, this selection state is maintained even if the code error detection state of another type shifts to a non-detection state.

Further, if a code error of the first type is detected at point B, the non-contact IC card shifts to a reception waiting state, and the code error detection state of each type is referred to again. When the code error detection state of each type is referred to again at point C, the first type code error detection state is a detection state, the second type code error detection state is a non-detection state, and the third type code error detection state is a detection state. Accordingly, the second type is selected.

Second Applied Example

Figure 12:
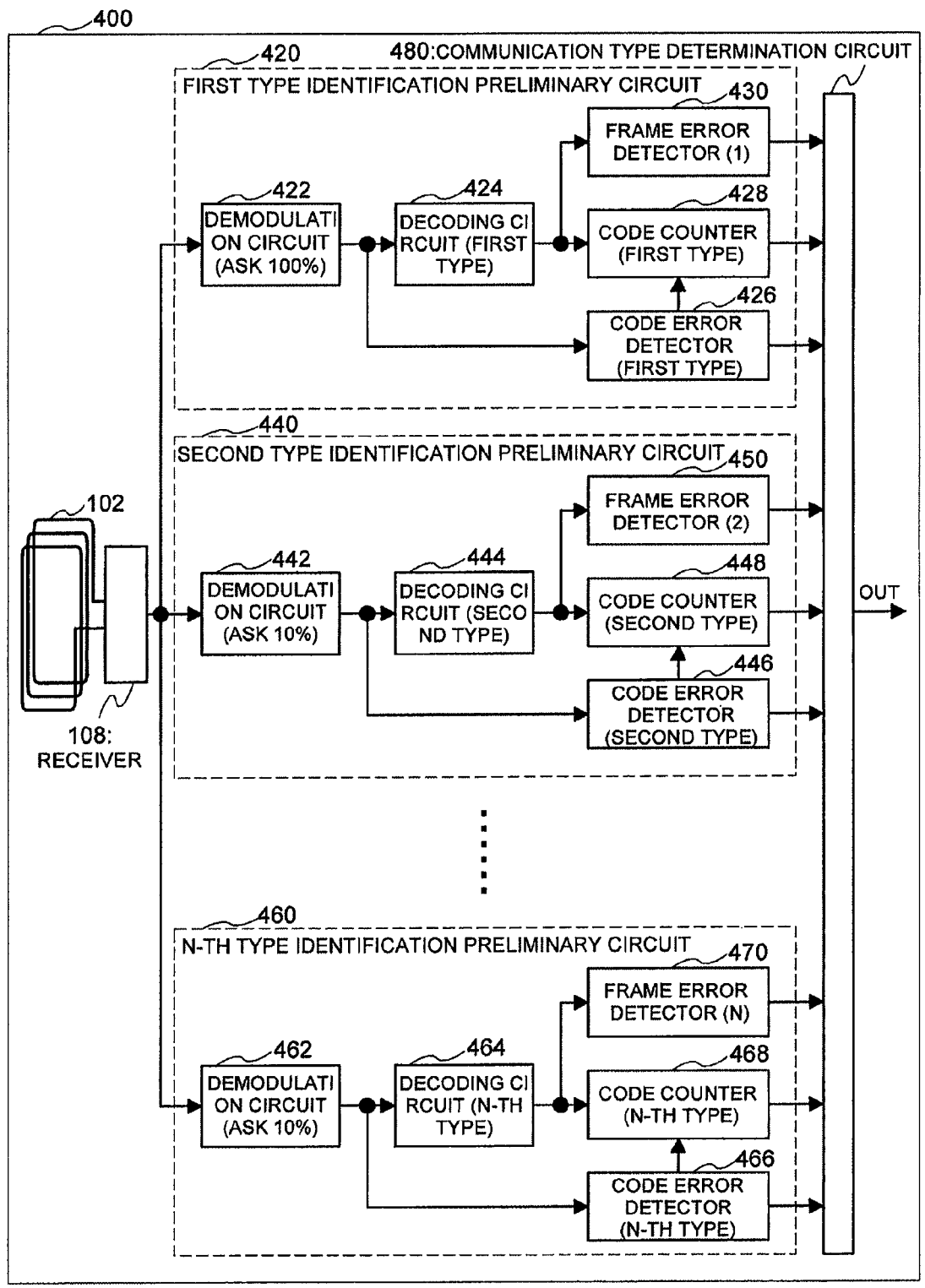
FIG. 12 is an explanatory diagram that shows a functional configuration of a non-contact IC card according to an applied example of the present invention.

Next, as another applied example (hereinafter referred to as a second applied example), a configuration of a non-contact IC card 400 including a plurality of identification preliminary circuits will be described with reference to FIG. 12. FIG. 12 is an explanatory diagram that shows a functional configuration of the non-contact IC card 400 according to the second applied example. Note that the functional configuration of the second applied example is obtained by extending that of the first embodiment.

Functional Configuration of the Non-Contact IC Card 400

As shown in FIG. 12, the non-contact IC card 400 is mainly formed by the antenna 102, the receiver 108, a first type identification preliminary circuit 420, a second type identification preliminary circuit 440, an N-th type identification preliminary circuit 460, and a communication type determination circuit 480. Although not specifically shown in FIG. 12, the non-contact IC card 400 also includes a plurality of preliminary circuits corresponding to the third type to the (N−1)th type. Note that, the difference of the respective type identification preliminary circuits relates to the type that they correspond to. Therefore, only the first type identification preliminary circuit 420 will be described as a representative example. The other type identification preliminary circuits can be understood by replacing, in the explanation, the first type with a corresponding type as necessary.

First Type Identification Preliminary Circuit 420

First, the first type identification preliminary circuit 420 will be described. The first type identification preliminary circuit 420 is mainly formed by a demodulation circuit 422, a decoding circuit 424, a code error detector 426, a code counter 428, and a frame error detector 430.

First, the modulation signal received by the receiver 108 via the antenna 102 is input to the demodulation circuit 422. The demodulation circuit 422 binarizes the input modulation signal and demodulates it with a predetermined modulation depth. Then, the data demodulated by the demodulation circuit 422 is input to the decoding circuit 424 and the code error detector 426.

The code error detector 426 determines whether or not each code of the input data is correct as a code of a predetermined encoding format. If it is determined that the code of the input data is not correct (abnormal) as the code of the predetermined encoding format, the code error detector 426 outputs a code error. The code error output from the code error detector 426 is input to the code counter 428 and the communication type determination circuit 480.

The decoding circuit 424 decodes the input data based on a predetermined encoding format. Then, the data decoded by the decoding circuit 424 is input to the frame error detector 430 and the code counter 428. The frame error detector 430 is a device that detects an error relating to a data frame (hereinafter referred to as a frame error) defined by a predetermined communication type (the first type). The frame error detected by the frame error detector 430 is input to the communication type determination circuit 480.

The code counter 428 is a device that counts the number of codes during a predetermined period using a code sampling clock of the predetermined communication type (the first type). The code counter 428 counts the number of codes in units of bits from the head of the input data, and resets the counted number of codes to 0 when the code error detector 426 detects a code error. When the code counter 428 completes the count of the number of the codes during the predetermined period, it sends a completion notification to the communication type determination circuit 480.

Communication Type Determination Circuit 480

The communication type determination circuit 480 is a device that identifies a communication type of a received signal based on code errors, frame errors, and completion notifications of the code counters that are input from the first type identification preliminary circuit 420, the second type identification preliminary circuit 440, . . . , and the N-th type identification preliminary circuit 460. The communication type determination circuit 480 selects the communication type corresponding to a circuit in which error information has not been detected from among the first type identification preliminary circuit 420, the second type identification preliminary circuit 440, . . . , and the N-th type identification preliminary circuit 460. Then, the communication type determination circuit 480 determines that the communication type of the reader/writer that has sent a signal is the communication type that is selected based on the error information output from each circuit. Further, the communication type determination circuit 480 may reduce the amount of power supplied to the circuit in which the error information has been detected, or stop the power supply to the circuit.

Note that, when the communication type determination circuit 480 selects the communication type, it may just refer to the code error as the error information output from each circuit, or may refer to both the code error and the frame error. When the communication type determination circuit 480 only refers to the code error, it can determine the communication type at a higher speed. On the other hand, when the communication type determination circuit 480 refers to both the code error and the frame error, it can determine the communication type more accurately. As described above, provision of a plurality of preliminary circuits enables to respond to signals of a number of communication types.

Third Applied Example

Figure 13:
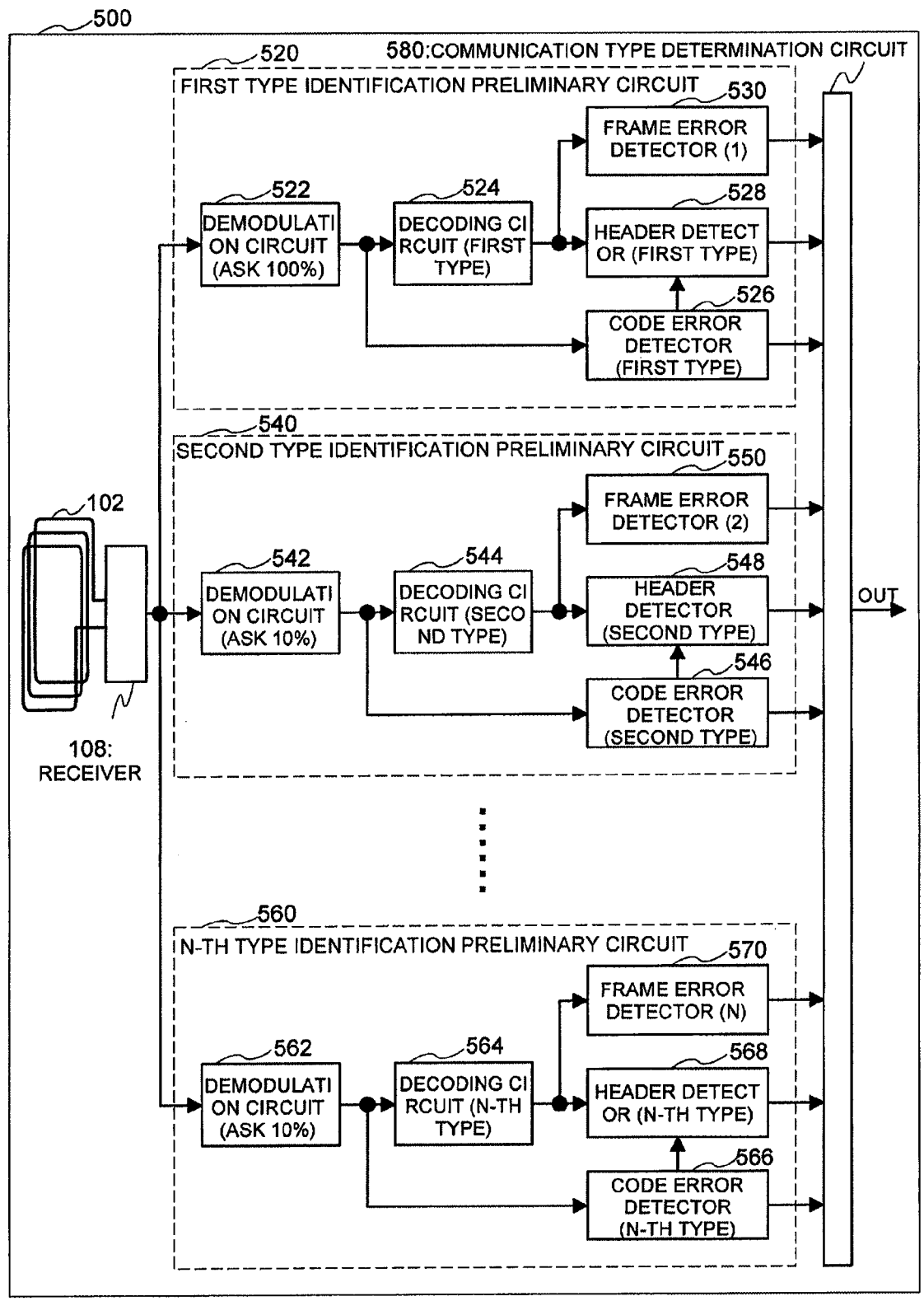
FIG. 13 is an explanatory diagram that shows a functional configuration of a non-contact IC card according to an applied example of the present invention.

Next, as another applied example (hereinafter referred to as a third applied example), a configuration of a non-contact IC card 500 including a plurality of identification preliminary circuits will be described with reference to FIG. 13. FIG. 13 is an explanatory diagram that shows a functional configuration of the non-contact IC card 500 according to the third applied example. Note that the functional configuration of the third applied example is obtained by extending that of the second embodiment.

Functional Configuration of the Non-Contact IC Card 500

As shown in FIG. 13, the non-contact IC card 500 is mainly formed by the antenna 102, the receiver 108, a first type identification preliminary circuit 520, a second type identification preliminary circuit 540, an N-th type identification preliminary circuit 560, and a communication type determination circuit 580. Although not specifically shown in FIG. 13, the non-contact IC card 500 also includes a plurality of preliminary circuits corresponding to the third type to the (N−1)th type. The difference of the respective type identification preliminary circuits relates to the type that they correspond to. Therefore, only the first type identification preliminary circuit 520 will be described as a representative example. The other type identification preliminary circuits can be understood by replacing the first type with a corresponding type, if necessary.

First Type Identification Preliminary Circuit 520

First, the first type identification preliminary circuit 520 will be described. The first type identification preliminary circuit 520 is mainly formed by a demodulation circuit 522, a decoding circuit 524, a code error detector 526, a header detector 528, and a frame error detector 530.

First, the modulation signal received by the receiver 108 via the antenna 102 is input to the demodulation circuit 522. The demodulation circuit 522 binarizes the input modulation signal and demodulates it with a predetermined modulation depth. Then, the data demodulated by the demodulation circuit 522 is input to the decoding circuit 524 and the code error detector 526.

The code error detector 526 determines whether or not each code of the input data is correct as a code of a predetermined encoding format. If it is determined that the code of the input data is not correct (abnormal) as the code of the predetermined encoding format, the code error detector 526 outputs a code error. The code error output from the code error detector 526 is input to the communication type determination circuit 580.

The decoding circuit 524 decodes the input data based on a predetermined encoding format. Then, the data decoded by the decoding circuit 524 is input to the frame error detector 530 and the header detector 528. The frame error detector 530 is a device that detects an error relating to a data frame (hereinafter referred to as a frame error) defined by a predetermined communication type (the first type). The frame error detected by the frame error detector 530 is input to the communication type determination circuit 580.

The header detector 528 is a device that detects header information of the input data. When the header detector 528 detects header information, a detection notice (a header confirmation signal) is input to the communication type determination circuit 580. In other words, the header detector 528 is a device that notifies the communication type determination circuit 580 of the detection time point of the header information, which is the timing at which the communication type is identified.

Communication Type Determination Circuit 580

The communication type determination circuit 580 is a device that identifies a communication type of a received signal based on code errors, frame errors, header confirmation signals and the like that are input from the first type identification preliminary circuit 520, the second type identification preliminary circuit 540, . . . , and the N-th type identification preliminary circuit 560. The communication type determination circuit 580 selects the communication type corresponding to a circuit in which error information has not been detected from among the first type identification preliminary circuit 520, the second type identification preliminary circuit 540, . . . , and the N-th type identification preliminary circuit 560. Then, the communication type determination circuit 580 determines that the communication type that is selected based on the error information output from each circuit is the communication type of the reader/writer. Further, the communication type determination circuit 580 may reduce the amount of power supplied to the circuit in which the error information has been detected, or stop the power supply to the circuit.

Note that, when the communication type determination circuit 580 selects the communication type, it may just refer to the code error as the error information output from each circuit, or may refer to both the code error and the frame error. When the communication type determination circuit 580 just refers to the code error, it can determine the communication type at a higher speed. On the other hand, when the communication type determination circuit 580 refers to both the code error and the frame error, it can determine the communication type more accurately. As described above, provision of a plurality of preliminary circuits makes it possible to respond to signals of a number of communication types.

Fourth Applied Example

Figure 14:
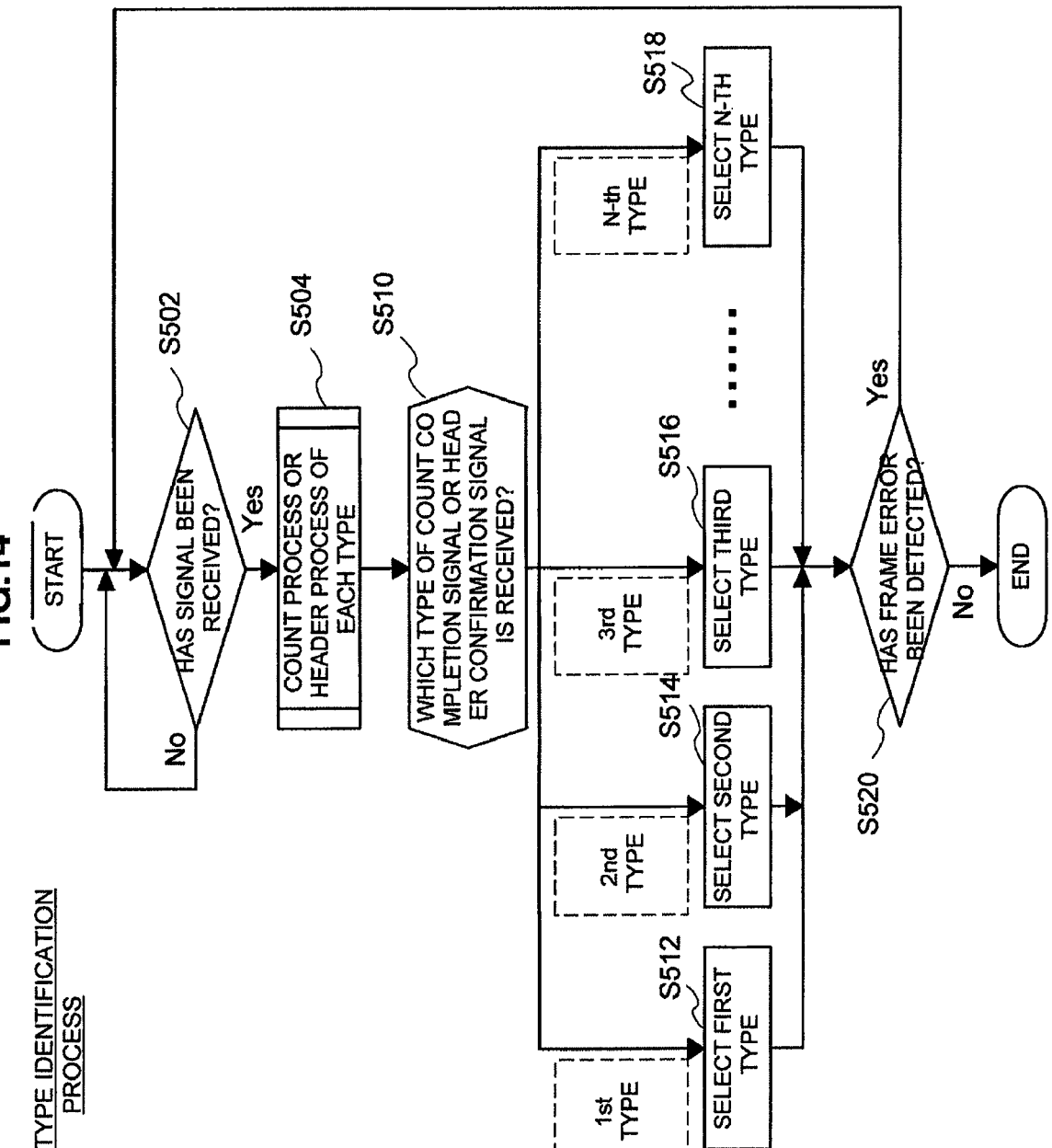
FIG. 14 is a flowchart that shows the flow of a type identification process according to an applied example of the present invention.

Here, with reference to FIG. 14, an applied example (hereinafter referred to as a fourth applied example) that has a configuration compatible with a number of communication types will be described. This configuration is obtained by extending the configuration of the first applied example. FIG. 14 is a flowchart that shows the flow of a type identification process S500 according to this applied example.

Type Identification Process S500

As shown in FIG. 14, a non-contact IC card maintains a reception waiting state while determining whether or not a signal has been received (S502). Then, the non-contact IC card performs a code count process and a header confirmation process corresponding to each type (S504). Then, the non-contact IC card determines which type of count completion signal or header confirmation signal is first output (S510). When the count completion signal or the header confirmation signal of the first type is output, the non-contact IC card proceeds to a process at step S512. When the count completion signal or the header confirmation signal of the second type is output, the non-contact IC card proceeds to a process at step S514. When the count completion signal or the header confirmation signal of the third type is output, the non-contact IC card proceeds to a process at step S516. When the count completion signal or the header confirmation signal of the N-th type is output, the non-contact IC card proceeds to a process at step S518. A similar process is also performed for the fourth type to the (N−1)th type.

At step S512, the non-contact IC card selects the first communication type (S512), and proceeds to the process at step S520. At step S514, the non-contact IC card selects the second communication type (S514), and proceeds to the process at step S520. At step S516, the non-contact IC card selects the third communication type (S516), and proceeds to the process at step S520. At step S518, the non-contact IC card selects the N-th communication type (S518), and proceeds to the process at step S520. A similar process is also preformed for the fourth type to the (N−1)th type.

At step S520, the non-contact IC card determines whether or not a frame error has been detected by the frame error detector corresponding to the selected communication type (S520). If a frame error has been detected, the non-contact IC card proceeds to the process at step S502 and shifts to a reception waiting state. If a frame error has not been detected, the non-contact IC card selects one of the communication types selected at steps S512, S514, S516, . . . , and S518, and ends the type identification process S500. As in this example, the technology of the first embodiment, the second embodiment, or the first applied example can be extended to a number of communication types.

Specific Effects

Hereinabove, the embodiments of the present invention, and the applied examples or modified examples thereof have been described. According to the configurations as described above, when a communication type compatible with incoming data is selected from among a plurality of communication types, just error information relating to the incoming data, or information including the error information is used to select and determine the communication type. This can reduce erroneous determinations of the communication type. Further, power consumption during operation can be reduced by saving the power that is supplied to a circuit corresponding to a communication type other the communication type selected by the communication type determination circuit. Furthermore, the time required to return from the power saving state to the reception possible state can be shortened, and data reception failures can be reduced. In addition, when the communication type is identified using only error information, the communication type can be identified before confirming the header information. Accordingly, the communication type can be identified at an earlier timing. As a result, a more advanced application can be implemented.

Device Configuration Example of the Non-Contact Communication Device

Figure 15:
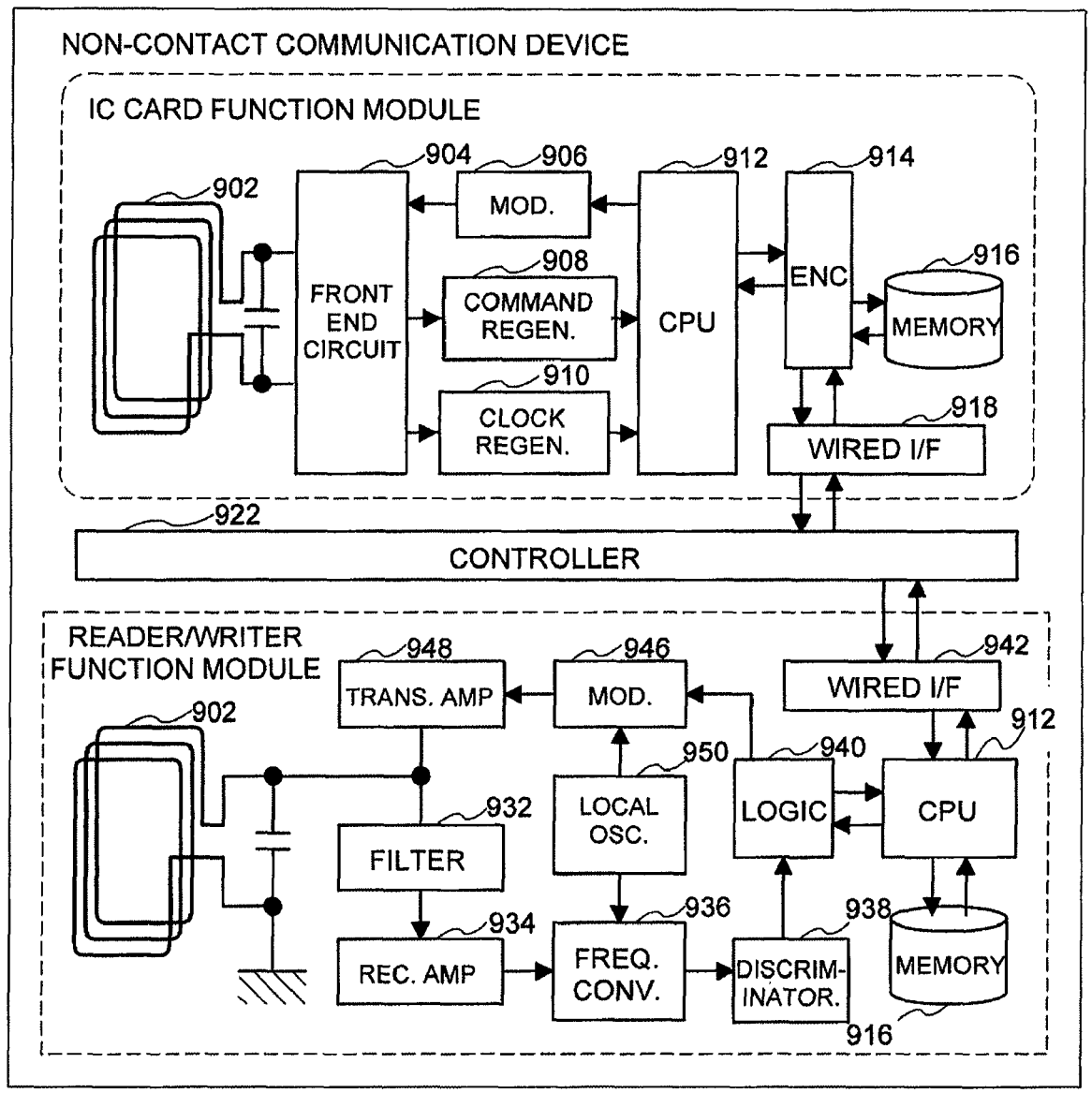
FIG. 15 is an explanatory diagram that shows an example of a device configuration of a non-contact communication device.

Here, with reference to FIG. 15, an example of a device configuration of a non-contact communication device that can realize the functions of the above-described devices will be briefly described. FIG. 15 is an explanatory diagram that shows an example of the device configuration of the non-contact communication device. Note that the functions of the above-described devices may be realized by using only a part of the structural elements of this non-contact communication device. Further, the structural elements denoted with the same reference numerals may be integrated in a hardware resource.

As shown in FIG. 15, the non-contact communication device is mainly formed by an IC card function providing module, a reader/writer function providing module, and a controller 922.

IC Card Function Providing Module

The IC card function providing module is formed by, for example, an antenna 902, a front end circuit 904, a modulator 906, a command regenerator 908, a clock regenerator 910, a control circuit 912, an encryption circuit 914, a memory 916, and a wired interface circuit 918.

The antenna 902 is a loop antenna, and is magnetically connected with a loop antenna provided in a reader/writer so as to receive commands and electric power. The front end circuit 904 rectifies a carrier wave transmitted from the reader/writer, and regenerates DC power. Further, the front end circuit 904 divides the obtained carrier wave frequency of 13.56 MHz, and sends the frequency-divided carrier wave to the command regenerator 908 and the clock regenerator 910. The command regenerator 908 regenerates a command from the input carrier wave, and sends the regenerated command to the control circuit 912. The clock regenerator 910 regenerates a clock to drive a logic circuit from the input carrier wave, and sends the regenerated clock to the control circuit 912. The front end circuit 904 supplies the regenerated power to the control circuit (CPU) 912.

When all the circuits are provided with power, the control circuit 912 drives each circuit in accordance with the regenerated command. Note that the data output from the control circuit 912 is encrypted by the encryption circuit 914 and stored in the memory 916. The memory 916 may be, for example, a memory device that records information magnetically, optically or magneto-optically. Alternatively, the memory 916 may be a semiconductor memory device that is used for a read only memory (ROM), a random access memory (RAM) and the like.

When the encrypted data stored in the memory 916 is transmitted, the front end circuit 904 changes load impedance at a power supply end of the antenna 902 based on encrypted data demodulated by the demodulator 906. Then, this change in the load impedance changes a magnetic field induced by the antenna 902. This change in the magnetic field induces a change in current flowing in the antenna of the reader/writer that is magnetically connected with the antenna 902. Thus, the encrypted data is transmitted.

The control circuit 912 may be controlled by the controller 922 via the wired interface circuit 918. Further, the IC card function providing module may transmit and receive information to and from the reader/writer function providing module to be described later via an interface I/F (not shown in the figures) so as to enable mutual control or one-way control between the modules.

Reader/Writer Function Providing Module

The reader/writer function providing module is formed by, for example, the antenna 902, a filter 932, a reception amplifier 934, a frequency converter 936, an identifier 938, a logic circuit 940, the control circuit 912, the memory 916, a wired interface circuit 942, a modulator 946, a local oscillator 950, and a transmitter amplifier 948.

The reader/writer function providing module sends commands and supplies electric power utilizing magnetic connection with a non-contact IC card and the like. This reader/writer function providing module supplies electric power to a non-contact IC card or the like so as to activate it under control by the control circuit (CPU) 912, and starts communication in accordance with a predetermined transmission protocol. At this time, the reader/writer function providing module establishes communication connection and performs an anti-collision process, an authentication process and the like.

The reader/writer function providing module generates a carrier wave using the local oscillator 950. When information is transmitted, first, the control circuit 912 reads data from the memory 916, and transmits it to the logic circuit 940. Then, the modulator 946 modulates the carrier wave generated by the local oscillator 950 based on a signal output from the logic circuit 940. Further, the transmitter amplifier 948 amplifies the modulated wave output from the modulator 946, and transmits it via the antenna 902.

On the other hand, when information is received, first, the modulated wave that has been received via the antenna 902 is input to the reception amplifier 934 after passing through the filter 932. Then, the frequency of the signal amplified by the reception amplifier 934 is converted by the frequency converter 936, and the signal is input to the logic circuit 940. Further, the signal output from the logic circuit 940 is recorded in the memory 916 by the control circuit 912, or transmitted to the external controller 922 via the wired interface circuit 942.

Hereinabove, the device configuration example of the non-contact communication device has been described. This non-contact communication device may be an information processing device, such as a mobile telephone, a mobile information terminal, various types of communication devices and a personal computer, or may be a game console, a home information appliance and the like. Further, various types of devices that incorporate a part or all of the function or the structural elements of the above-described non-contact communication device are also included in the technical scope of the above-described embodiments. It will be readily apparent that a program that causes a computer to realize the function of each of the structural elements, and a storage medium storing the program are also included in the technical scope of the above-described embodiments.

It should be understood by those skilled in the art that various modifications, combinations, sub-combinations and alterations may occur depending on design and other factors insofar as they are within the scope of the appended claims or the equivalents thereof.

For example, in the above description, the type identification is performed based on the outputs from the preliminary circuits that are provided in parallel corresponding to communication types. However, the present invention is not limited to this configuration. For example, it is also possible to use a configuration including a plurality of types that are in accordance with the same communication standard but have different sampling rates. Further, the type identification may be performed by combining this configuration and any one of the above-described other configurations.

What is claimed is:

1. An IC card, comprising:
    an error detection portion that, for each of a plurality of communication types, performs error detection of incoming data received by non-contact communication, based on respective encoding formats defined by each of the communication types; and a type identification portion that identifies, among the plurality of communication types, a communication type in which error information is not detected by the error detection portion as a communication type of the incoming data.

2. The IC card according to claim 1, wherein the error detection portion detects, as the error information, a code error and a frame error of the incoming data.

3. The IC card according to claim 1, wherein the error detection portion detects error information of the incoming data in units of codes until a predetermined number of codes is reached.

4. The IC card according to claim 1, wherein the error detection portion detects error information of the incoming data in units of codes until header information of the incoming data is reached.

5. An IC card comprising:

an error detection portion that, for each of a plurality of communication types, performs error detection of incoming data received by non-contact communication, based on respective encoding formats defined by each of the communication types; and a type identification portion that identifies, among the plurality of communication types, a communication type in which error information is not detected by the error detection portion as a communication type of the incoming data;

a plurality of decoding portions which correspond to the different encoding formats and which are capable of decoding encoded data of the corresponding encoding format; and a power saving control portion that reduces or stops power supply to the decoding portion corresponding to an encoding format in which the error information is detected.

6. An information processing device equipped with an IC card, comprising:

an error detection portion that, for each of a plurality of communication types, performs an error detection of incoming data received by a non-contact communication, based on respective encoding formats defined by each of the communication types; and a type identification portion that identifies, among the plurality of communication types, a communications type in which error information is not detected by the error detection portion as a communication type of the incoming data.

7. The information processing device according to claim 6, wherein the information processing device is a mobile telephone quipped with a call function.

8. A communication type identification method, comprising:

performing, for each of a plurality of communication types, an error detection of incoming data received by a non-contact communication, based on respective encoding formats defined by each of the communication types; and identifying, among the plurality of communication types, a communication type in which error information is not detected in the performing as a communication type of the incoming data, with a processing unit.

9. A non-transitory storage medium encoded with a program comprising instructions that command a computer to execute the functions of:

performing, for each of a plurality of communication types, an error detection of incoming data received by a non-contact communication, based on encoding formats defined by each of the communication types; and identifying, among the plurality of communication types, a communication type in which error information is not detected by the function of performing as a communication type of the incoming data.

10. The IC card according to claim 1, wherein the type identification portion identifies a communication type in which the error information is not detected within a predetermined number of codes since a reception of the incoming data by the non-contact communication as the communication type of the incoming data.

* * * * *